(12) United States Patent
Takada et al.

(10) Patent No.: US 11,483,424 B2
(45) Date of Patent: Oct. 25, 2022

(54) HANDS-FREE DEVICE, DATA TRANSFER METHOD, AND COMPUTER-READABLE MEDIUM

(71) Applicant: Panasonic Intellectual Property Management Co., Ltd., Osaka (JP)

(72) Inventors: Kisei Takada, Kanagawa Ken (JP); Hiroki Oobayashi, Kanagawa Ken (JP); Akihiro Murano, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/189,968

(22) Filed: Mar. 2, 2021

(65) Prior Publication Data

US 2021/0297520 A1 Sep. 23, 2021

(30) Foreign Application Priority Data

Mar. 23, 2020 (JP) .............................. JP2020-051859

(51) Int. Cl.
*H04W 4/16* (2009.01)
*H04M 1/60* (2006.01)
*H04M 1/57* (2006.01)
*H04W 4/12* (2009.01)

(52) U.S. Cl.
CPC ......... *H04M 1/6091* (2013.01); *H04M 1/575* (2013.01); *H04W 4/12* (2013.01); *H04W 4/16* (2013.01); *H04M 2250/02* (2013.01); *H04M 2250/60* (2013.01)

(58) Field of Classification Search
CPC .............. H04M 1/6091; H04M 1/575; H04M 2250/02; H04M 2250/60; H04W 4/12; H04W 4/16
See application file for complete search history.

(56) References Cited

U.S. PATENT DOCUMENTS

| | | | |
|---|---|---|---|
| 10,111,272 B1* | 10/2018 | Withers | ................. H04W 76/14 |
| 2005/0200467 A1* | 9/2005 | Au | .......................... B60Q 1/343 |
| | | | 340/465 |
| 2009/0265100 A1 | 10/2009 | Murakami | |
| 2010/0197362 A1* | 8/2010 | Saitoh | ................. H04M 1/2757 |
| | | | 455/569.2 |
| 2010/0285787 A1 | 11/2010 | Matsuda | |
| 2016/0014273 A1* | 1/2016 | Joh | ................... H04M 3/42178 |
| | | | 455/563 |

(Continued)

FOREIGN PATENT DOCUMENTS

| | | |
|---|---|---|
| JP | 2002-193046 | 7/2002 |
| JP | 2009-253603 | 10/2009 |

(Continued)

*Primary Examiner* — Dai Phuong
(74) *Attorney, Agent, or Firm* — Greenblum & Bernstein, P.L.C.

(57) ABSTRACT

A hands-free device includes a memory, and a hardware processor coupled to the memory. The hardware processor being configured to: connect to a mobile phone to enable a hands-free call; receive at least one of outgoing call history data, incoming call history data, missed call history data, and phonebook data stored in the mobile phone; and delete data transferred from the mobile phone in a case where a predetermined condition is satisfied.

11 Claims, 23 Drawing Sheets

(56) References Cited

U.S. PATENT DOCUMENTS

| | | | |
|---|---|---|---|
| 2020/0092837 A1* | 3/2020 | Hartley | H04W 76/10 |
| 2020/0162914 A1* | 5/2020 | Chun | B60N 2/002 |
| 2020/0296198 A1* | 9/2020 | Sasaki | H04M 1/6091 |

FOREIGN PATENT DOCUMENTS

| | | |
|---|---|---|
| JP | 2009-267535 | 11/2009 |
| JP | 2010-263556 | 11/2010 |
| JP | 2013-239974 | 11/2013 |
| JP | 6094692 | 3/2017 |
| JP | 2019-110612 | 7/2019 |

\* cited by examiner

FIG.5

| | PATTERN 1 | | PATTERN 2 | | PATTERN 3 | |
|---|---|---|---|---|---|---|
| | AUTOMATIC DELETION SETTING | DELETION TIMER SETTING | AUTOMATIC DELETION SETTING | DELETION TIMER SETTING | AUTOMATIC DELETION SETTING | DELETION TIMER SETTING |
| | ON | OFF | ON | ON | OFF | - |
| DELETION CONDITIONS | ENGINE TURNS ON AFTER ENGINE TURNS OFF | | ENGINE TURNS ON AFTER LAPSE OF SET TIME OR MORE FROM ENGINE OFF | | MANUAL DELETION | |
| | AFTER BT CONNECTION WITH MOBILE PHONE IS DISCONNECTED, BT CONNECTION IS RE-ESTABLISHED WITH SAME MOBILE PHONE | | AFTER BT CONNECTION WITH MOBILE PHONE IS DISCONNECTED, BT CONNECTION IS RE-ESTABLISHED WITH SAME MOBILE PHONE AFTER LAPSE OF SET TIME OR MORE | | | |
| | AFTER BT CONNECTION WITH MOBILE PHONE IS DISCONNECTED, BT CONNECTION IS ESTABLISHED WITH FURTHER MOBILE PHONE | | AFTER BT CONNECTION WITH MOBILE PHONE IS DISCONNECTED, BT CONNECTION IS ESTABLISHED WITH FURTHER MOBILE PHONE | | | |
| | MANUAL DELETION | | MANUAL DELETION | | | |

FIG.11A

| OUTGOING CALL HISTORY DATA | | |
|---|---|---|
| TARO ABE | 090××××××× | AUGUST 10 12:15 |
| HANAKO SATO | 090××××××× | AUGUST 10 12:00 |
| TARO ABE | 090××××××× | AUGUST 10 11:20 |
| KAZUO TANAKA | 090××××××× | AUGUST 10 11:10 |
| KAZUO TANAKA | 090××××××× | AUGUST 10 10:50 |
| JIRO NOMURA | 090××××××× | AUGUST 10 10:15 |

FIG.11B

| PHONEBOOK DATA | |
|---|---|
| ICHIRO KATO | 090××××××× |
| GORO OKADA | 090××××××× |
| SHIRO MORI | 090××××××× |
| JIRO YAMADA | 090××××××× |
| ICHIRO YOSHIMOTO | 090××××××× |
| SABURO WATANABE | 090××××××× |
| ... | 090××××××× |

FIG.11C

| OUTGOING CALL HISTORY DATA | | |
|---|---|---|
| ICHIRO KATO | 090××××××× | AUGUST 10 13:40 |
| TARO ABE | 090××××××× | AUGUST 10 12:15 |
| HANAKO SATO | 090××××××× | AUGUST 10 12:00 |
| TARO ABE | 090××××××× | AUGUST 10 11:20 |
| KAZUO TANAKA | 090××××××× | AUGUST 10 11:10 |
| KAZUO TANAKA | 090××××××× | AUGUST 10 10:50 |

← DISPLAY NAME REGISTERED ON PHONEBOOK DATA

FIG.12A

| INCOMING CALL HISTORY DATA | | |
|---|---|---|
| ICHIRO KATO | 090×××××××× | AUGUST 10 13:00 |
| AIKO HAYASHI | 090×××××××× | AUGUST 10 12:25 |
| ROKURO MORI | 090×××××××× | AUGUST 10 11:45 |
| ICHIRO KATO | 090×××××××× | AUGUST 10 11:15 |
| SHICHIRO YAMADA | 090×××××××× | AUGUST 10 11:10 |
| HACHIRO UEDA | 090×××××××× | AUGUST 10 10:20 |

FIG.12B

| PHONEBOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.12C

| INCOMING CALL HISTORY DATA | | |
|---|---|---|
| ICHIRO YOSHIMOTO | 090×××××××× | AUGUST 10 13:25 |
| ICHIRO KATO | 090×××××××× | AUGUST 10 13:00 |
| AIKO HAYASHI | 090×××××××× | AUGUST 10 12:25 |
| ROKURO MORI | 090×××××××× | AUGUST 10 11:45 |
| ICHIRO KATO | 090×××××××× | AUGUST 10 11:15 |
| SHICHIRO YAMADA | 090×××××××× | AUGUST 10 11:10 |

← DISPLAY NAME REGISTERED ON PHONEBOOK DATA

FIG.13A

| MISSED CALL HISTORY DATA | | |
|---|---|---|
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OOBAYASHI | 090×××××××× | AUGUST 10 11:04 |
| HANAKO SAITO | 090×××××××× | AUGUST 10 10:54 |
| KAZUO OOMURA | 090×××××××× | AUGUST 10 10:24 |

FIG.13B

| PHONEBOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.13C

| MISSED CALL HISTORY DATA | | |
|---|---|---|
| SABURO WATANABE | 090×××××××× | AUGUST 10 12:46 |
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OOBAYASHI | 090×××××××× | AUGUST 10 11:04 |
| HANAKO SAITO | 090×××××××× | AUGUST 10 10:54 |

← DISPLAY NAME REGISTERED ON PHONEBOOK DATA

FIG.14

| OUTGOING CALL HISTORY DATA | | |
|---|---|---|
| TARO ABE | 090xxxxxxxx | AUGUST 10 12:15 |
| HANAKO SATO | 090xxxxxxxx | AUGUST 10 12:00 |
| TARO ABE | 090xxxxxxxx | AUGUST 10 11:20 |
| KAZUO TANAKA | 090xxxxxxxx | AUGUST 10 11:10 |
| KAZUO TANAKA | 090xxxxxxxx | AUGUST 10 10:50 |
| JIRO NOMURA | 090xxxxxxxx | AUGUST 10 10:15 |

| INCOMING CALL HISTORY DATA | | |
|---|---|---|
| ICHIRO KATO | 090xxxxxxxx | AUGUST 10 13:00 |
| AIKO HAYASHI | 090xxxxxxxx | AUGUST 10 12:25 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |
| HACHIRO UEDA | 090xxxxxxxx | AUGUST 10 10:20 |

| MISSED CALL HISTORY DATA | | |
|---|---|---|
| TARO MURAKAMI | 090xxxxxxxx | AUGUST 10 12:28 |
| HANAKO SAITO | 090xxxxxxxx | AUGUST 10 12:24 |
| HANAKO UEDA | 090xxxxxxxx | AUGUST 10 12:06 |
| JIRO OOBAYASHI | 090xxxxxxxx | AUGUST 10 11:04 |
| HANAKO SAITO | 090xxxxxxxx | AUGUST 10 10:54 |
| KAZUO OOMURA | 090xxxxxxxx | AUGUST 10 10:24 |

| ENTIRE HISTORY DATA | | |
|---|---|---|
| ICHIRO KATO | 090xxxxxxxx | AUGUST 10 13:00 |
| TARO MURAKAMI | 090xxxxxxxx | AUGUST 10 12:28 |
| AIKO HAYASHI | 090xxxxxxxx | AUGUST 10 12:25 |
| HANAKO SAITO | 090xxxxxxxx | AUGUST 10 12:24 |
| TARO ABE | 090xxxxxxxx | AUGUST 10 12:15 |
| HANAKO UEDA | 090xxxxxxxx | AUGUST 10 12:06 |
| HANAKO SATO | 090xxxxxxxx | AUGUST 10 12:00 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |

OUTGOING HISTORY DATA HAVING DUPLICATED PHONE NUMBER IS NOT DISPLAYED

| OUTGOING PHONE NUMBER | OUTGOING CALL DATE/TIME |
|---|---|
| 09000000005 | MAY 10 17:25 |
| 09000000004 | MAY 10 17:14 |
| 09000000003 | MAY 10 17:12 |
| 09000000002 | MAY 10 17:08 |
| 09000000001 | MAY 10 17:01 |

} OUTGOING CALL HISTORY DATA AUTOMATICALLY TRANSFERRED FROM MOBILE PHONE

↓

(b)

| OUTGOING PHONE NUMBER | OUTGOING CALL DATE/TIME |
|---|---|
| 09000000100 | MAY 10 17:32 |
| 09000000005 | MAY 10 17:25 |
| 09000000004 | MAY 10 17:14 |
| 09000000003 | MAY 10 17:12 |
| 09000000002 | MAY 10 17:08 |

} OUTGOING CALL HISTORY DATA ON HANDS-FREE DEVICE

} OUTGOING CALL HISTORY DATA AUTOMATICALLY TRANSFERRED FROM MOBILE PHONE

| INCOMING PHONE NUMBER | INCOMING CALL DATE/TIME |
|---|---|
| 09000000010 | MAY 10 17:45 |
| 09000000009 | MAY 10 17:20 |
| 09000000008 | MAY 10 16:59 |
| 09000000007 | MAY 10 16:52 |
| 09000000006 | MAY 10 16:50 |

} INCOMING CALL HISTORY DATA AUTOMATICALLY TRANSFERRED FROM MOBILE PHONE

↓

(b)

| INCOMING PHONE NUMBER | INCOMING CALL DATE/TIME |
|---|---|
| 09000000200 | MAY 10 17:50 |
| 09000000010 | MAY 10 17:45 |
| 09000000009 | MAY 10 17:20 |
| 09000000008 | MAY 10 16:59 |
| 09000000007 | MAY 10 16:52 |

} INCOMING CALL HISTORY DATA ON HANDS-FREE DEVICE

} INCOMING CALL HISTORY DATA AUTOMATICALLY TRANSFERRED FROM MOBILE PHONE

FIG.19
(a)
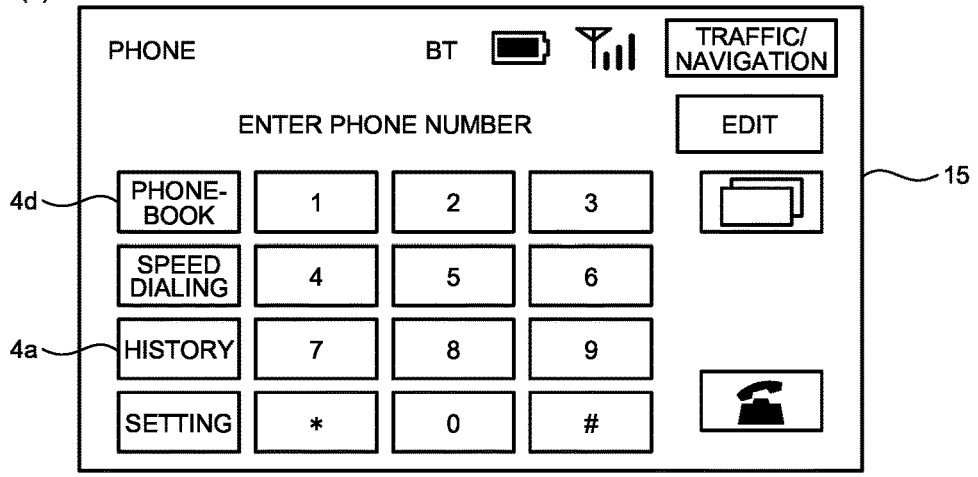
(b)
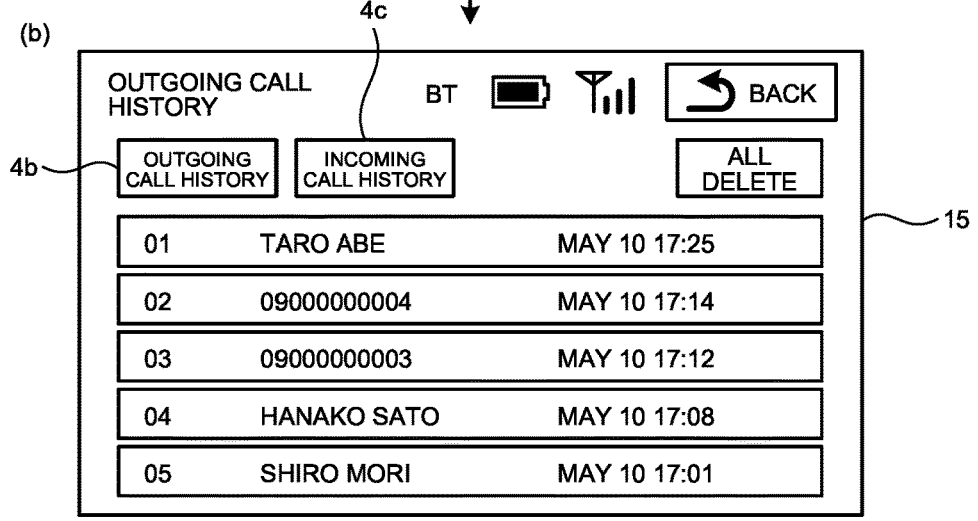
(c)
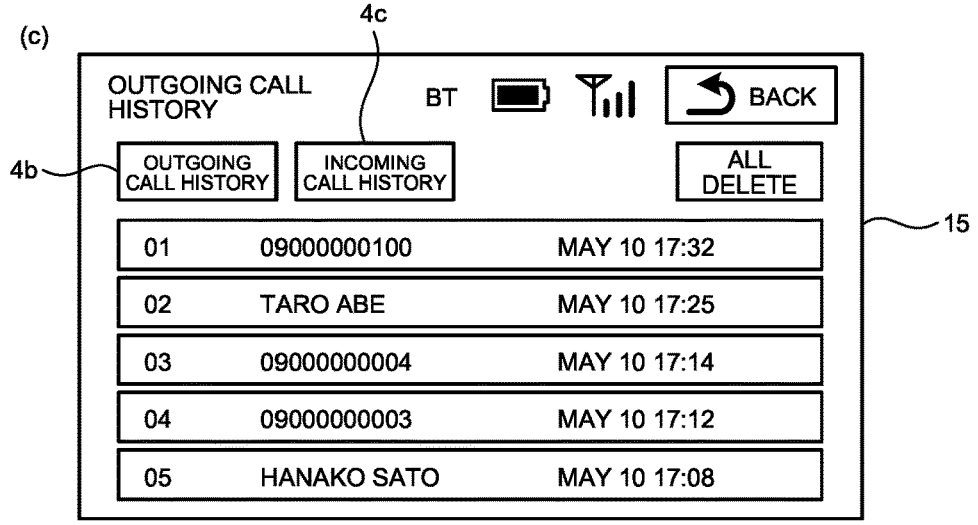

FIG.20
(a)
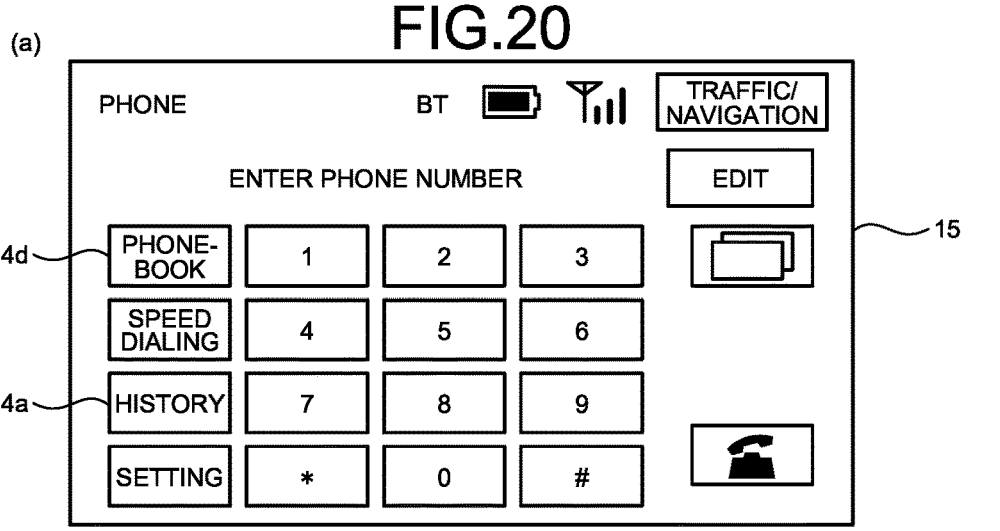
PRESS "HISTORY BUTTON"
PRESS "INCOMING CALL HISTORY BUTTON"
(b)
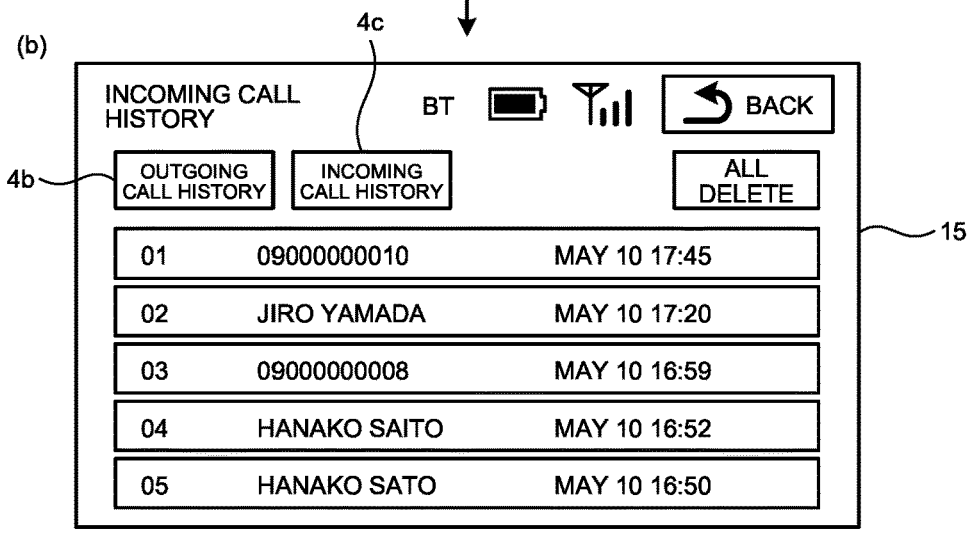
(c)
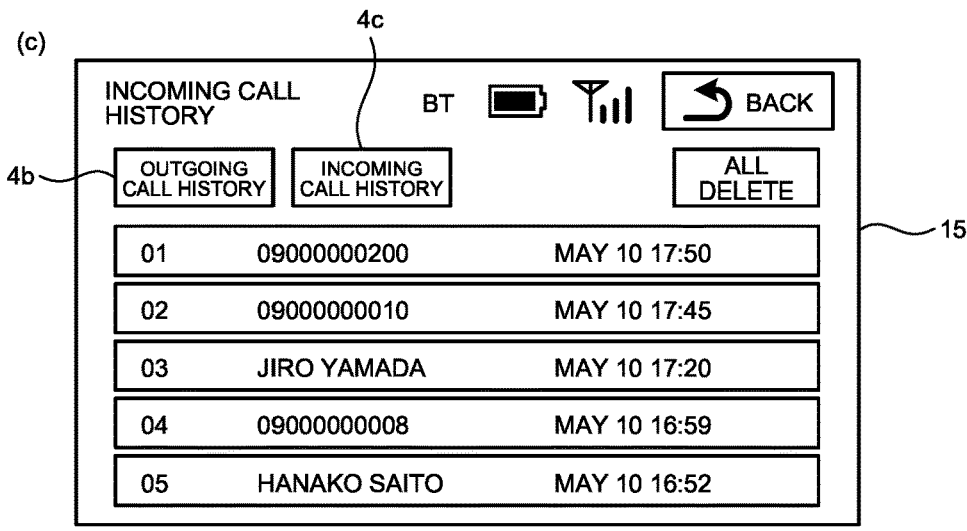

FIG.22

| PHONE NUMBER | REGISTERED NAME |
|---|---|
| 09000000001 | KAZUO TANAKA |
| 09000000002 | TARO ITO |
| 09000000005 | TARO ABE |
| 09000000006 | SHIRO MORI |
| 09000000007 | GORO KODAMA |
| 09000000009 | HANAKO SAITO |
| ⋮ | ⋮ |

FIG.24
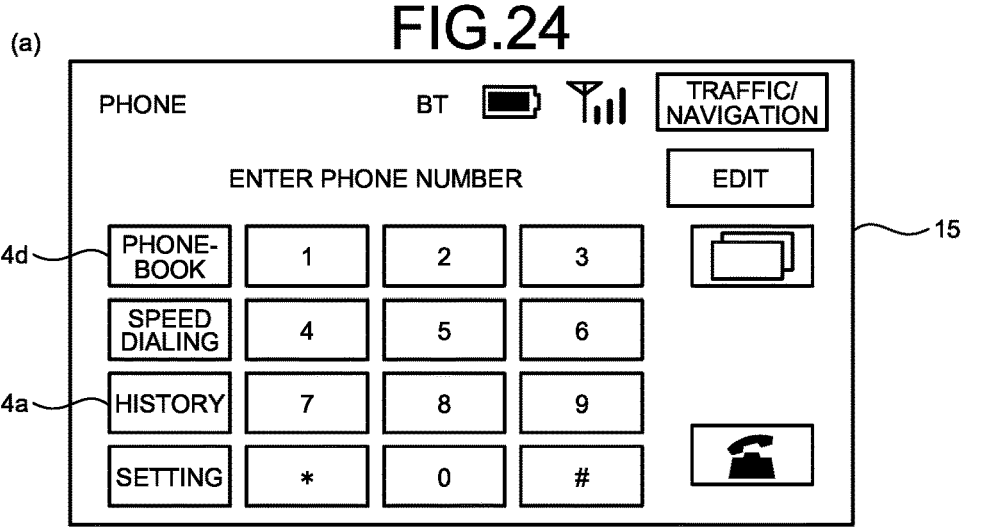
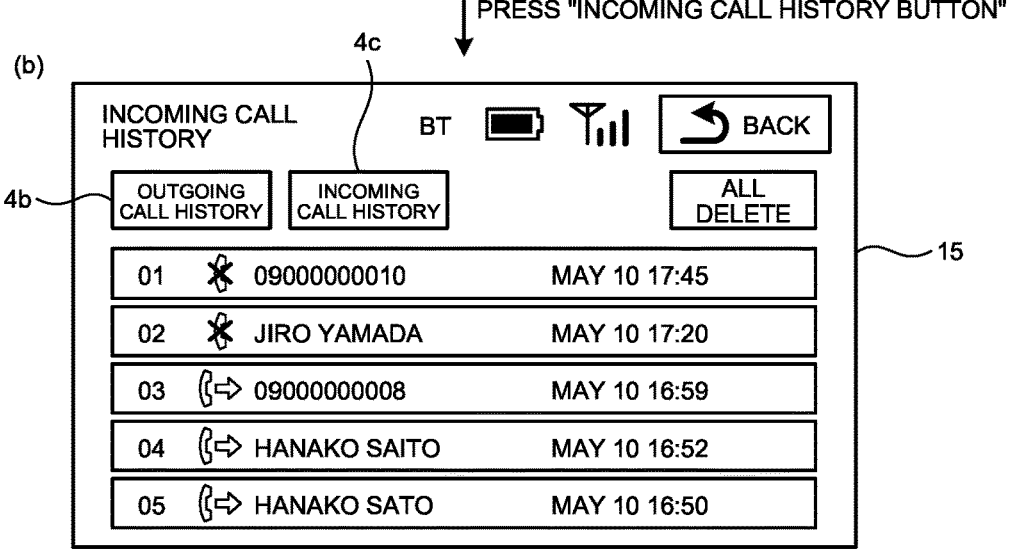
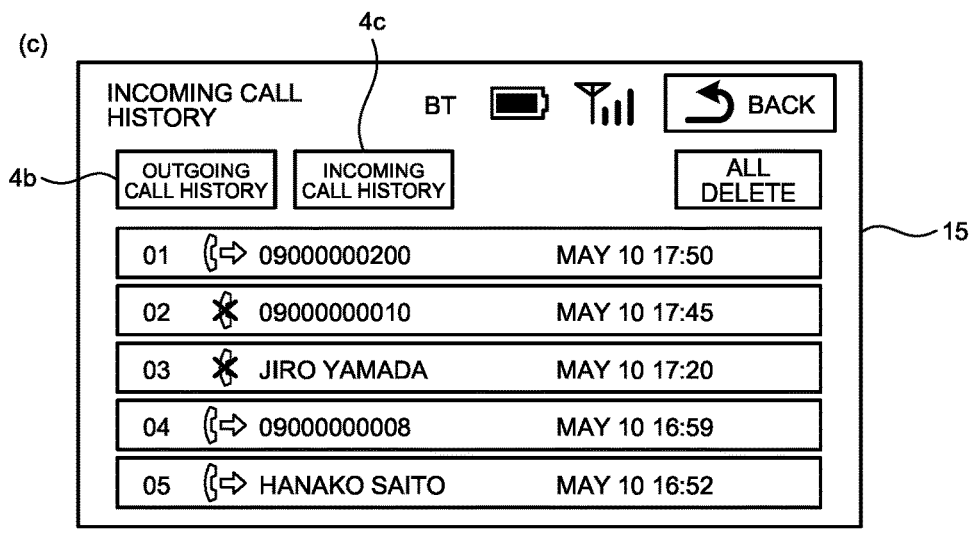

HANDS-FREE DEVICE, DATA TRANSFER METHOD, AND COMPUTER-READABLE MEDIUM

CROSS-REFERENCE TO RELATED APPLICATIONS

This application is based upon and claims the benefit of priority from Japanese Patent Application No. 2020-051859, filed on Mar. 23, 2020, the entire contents of which are incorporated herein by reference.

FIELD

Embodiments described herein relate generally to a hands-free device, a data transfer method, and a computer-readable medium.

BACKGROUND

There is a conventionally known hands-free device that establishes a communication channel with a mobile phone and thereby enables a user to receive and make a call without directly operating the mobile phone. Such a hands-free device is installed in a vehicle and is used when a user has a phone conversation while driving, for example.

There is another known technique that transfers phonebook data and incoming/outgoing call history data from a mobile phone to a hands-free device.

However, in the prior art, there are cases where considerations are insufficient regarding the timing of deleting data transferred to the hands-free device.

The present disclosure provides a hands-free device, a data transfer method, and a computer-readable medium capable of deleting, at an appropriate timing, data transferred to the hands-free device.

SUMMARY

A hands-free device according to the present disclosure includes a memory, and a hardware processor coupled to the memory. The hardware processor being configured to: connect to a mobile phone to enable a hands-free call; receive at least one of outgoing call history data, incoming call history data, missed call history data, and phonebook data stored in the mobile phone; and delete data transferred from the mobile phone in a case where a predetermined condition is satisfied.

BRIEF DESCRIPTION OF THE DRAWINGS

FIG. 5 is a table illustrating an example of a relationship between automatic deletion setting, deletion timer setting, vehicle states, communication connection states between a hands-free device and a mobile phone, and the presence/absence of manual deletion operation, according to an embodiment;

FIGS. 11A to 11C are diagrams illustrating an example of a correspondence between outgoing call history data and phonebook data according to an embodiment;

FIGS. 12A to 12C are diagrams illustrating an example of a correspondence between incoming call history data and phonebook data according to an embodiment;

FIGS. 13A to 13C are diagrams illustrating an example of a correspondence between missed call history data and phonebook data according to an embodiment;

FIG. 14 is a diagram illustrating an example of outgoing call history data, incoming call history data, missed call history data, and entire history data according to an embodiment;

FIG. 17 is a diagram illustrating an example of outgoing call history data according to an embodiment;

FIG. 18 is a diagram illustrating an example of incoming call history data according to an embodiment;

FIG. 19 is a diagram illustrating an example of a transition of a display screen when a user performs an outgoing call operation using an outgoing call history according to an embodiment;

FIG. 20 is a diagram illustrating an example of a transition of a display screen when a user performs an outgoing call operation using an incoming call history according to an embodiment;

FIG. 22 is a diagram illustrating an example of phonebook data according to an embodiment;

FIG. 24 is a diagram illustrating another example of a transition of a display screen when a user performs an outgoing call operation using an incoming call history according to an embodiment.

DETAILED DESCRIPTION

Hereinafter, a hands-free device, a data transfer method, and a computer-readable medium according to an embodiment of the present disclosure will be described with reference to the drawings.

Figure 1:
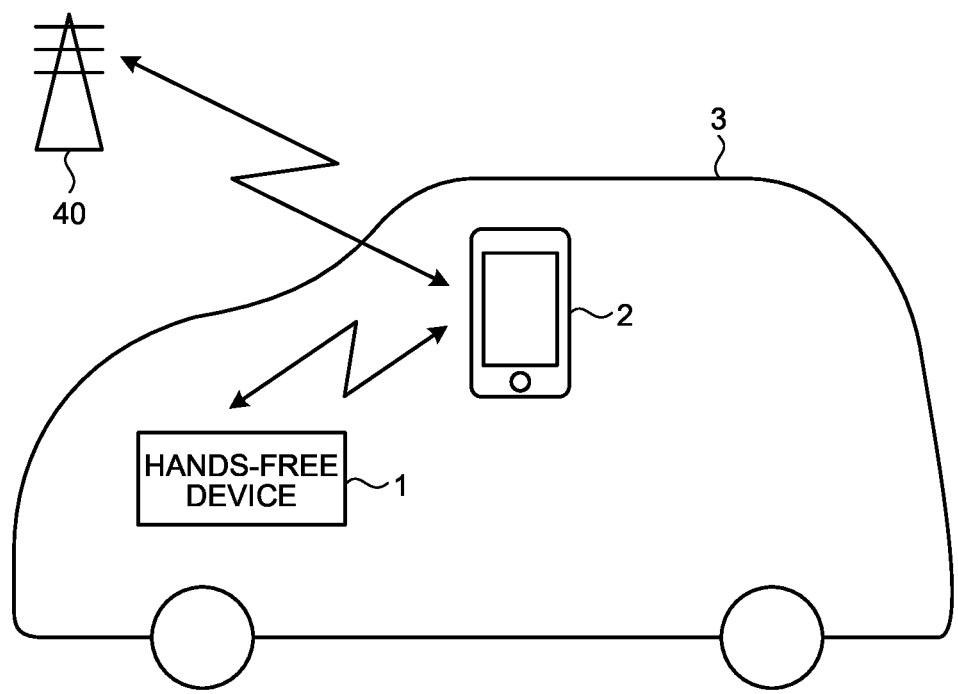
FIG. 1 is a view illustrating an example of a usage mode of a hands-free device according to an embodiment.

FIG. 1 is a view illustrating an example of a usage mode of a hands-free device 1 according to the present embodiment. As illustrated in FIG. 1, the hands-free device 1 of the present embodiment can be mounted on a vehicle 3. The hands-free device 1 is communicably connected with a mobile phone 2. Furthermore, the mobile phone 2 performs radio communication with a base station 40 via a mobile phone network. The mobile phone 2 is a smartphone, for example, and has a communication function using the Bluetooth (registered trademark) method, which is a short-range wireless communication means. The mobile phone 2 may be a mobile phone of a type other than a smartphone as long as it has a communication function using the Bluetooth method.

The hands-free device 1 connects to a mobile phone network via the mobile phone 2. With this configuration, for example, the driver of the vehicle 3 can make and receive a phone call by operating the hands-free device 1 without operating the mobile phone 2. The hands-free device 1 may be implemented as one function of an in-vehicle navigator mounted on the vehicle 3, for example.

Figure 2:
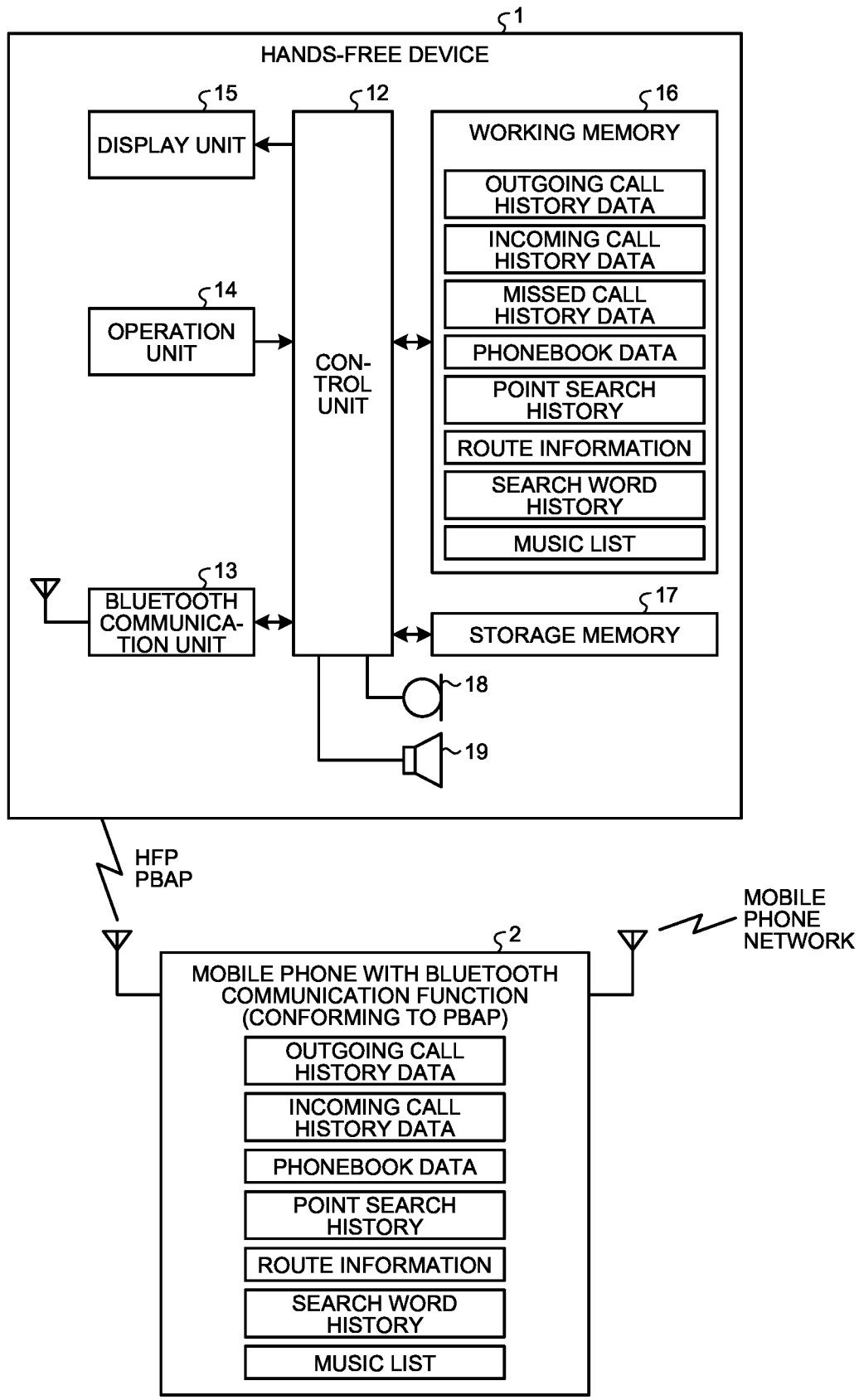
FIG. 2 is a diagram illustrating an example of a hardware configuration of a hands-free device according to an embodiment.

FIG. 2 is a diagram illustrating an example of a hardware configuration of the hands-free device 1 according to the present embodiment. The hands-free device 1 of the present embodiment is, for example, an in-vehicle navigator with a hands-free function. The hands-free device 1 includes a control unit 12, a Bluetooth communication unit 13, an operation unit 14, a display unit 15, working memory 16, storage memory 17, a microphone 18, and a speaker 19.

The control unit 12 controls entire operation such as communication operation and data management operation of the hands-free device 1. The control unit 12 is a processor such as a Central Processing Unit (CPU), for example.

Conforming to the Bluetooth method, which is a short-range wireless communication means, the Bluetooth communication unit 13 establishes a wireless communication channel with the mobile phone 2 existing in the Bluetooth wireless communication range to perform communication conforming to the Bluetooth communication standard. Note that this case assumes that the mobile phone 2 has a Bluetooth communication function and exists within the Bluetooth wireless communication range of the hands-free device 1.

The Bluetooth communication unit 13 in the present embodiment conforms to a well-known Hands Free Profile (HFP) for making hands-free calls, and a Phone Book Access Profile (PBAP) for performing phonebook data transfer and incoming/outgoing call history data transfer. These profiles represent communication protocols defined for each of functions.

As is well known, when used independently (in a state where the HFP connection is not established with the hands-free device 1 which is hands-free equipment), the mobile phone 2 can establish a mobile phone channel with the base station 40 of a mobile phone network so as to perform outgoing call processing and incoming call processing independently. In this case, as outgoing call processing on the mobile phone 2, for example, a user operates dialing keys (numerical keys "0" to "9") (not illustrated) to input the phone number of the call destination, and then operates a Call key (not illustrated), thereby enabling an outgoing call using the phone number as the call destination, establishing a phone call with a mobile phone being the call destination.

In addition, as incoming call processing on the mobile phone 2, when an incoming call signal is received from the base station 40 in response to a phone call originated by the caller's mobile phone to the mobile phone 2 as a call destination, the mobile phone 2 receives the phone number of the caller's mobile phone from the base station 40 as an incoming phone number. When the user operates a Talk key (not illustrated) and can thereby answer the mobile phone from the caller, establishing a phone call with the caller's mobile phone.

In addition, the mobile phone 2 has a clock unit (not illustrated) that clocks the date/time, and stores and retains a plurality of sets of outgoing call history data in which a corresponding set of an outgoing phone number input from the dialing keys in the above-described outgoing call processing and outgoing call date/time based on the date/time clocked by the clock unit is contained as one set of data. The mobile phone 2 further stores and retains a plurality of sets of incoming call history data in which a corresponding set of an incoming phone number received from the base station 40 in the above-described incoming call processing and the incoming call date/time based on the date/time clocked by the clock unit is contained as one set of data.

Moreover, the mobile phone 2 further stores and retains a plurality of sets of missed call history data in which a corresponding set of an incoming phone number received from the base station 40 when the call was not received in the incoming call and the incoming call date/time based on the date/time clocked by the clock unit is contained as one set of data. The mobile phone 2 further retains a plurality of sets of phonebook data in which a correspondence set of a phone number and a registered name is contained as one set of data. The phonebook data contains the phone numbers and the registered names input by the user, and specifically stores approximately 500 sets of the phone numbers and the registered names in association with each other in non-volatile memory (not illustrated), for example.

In a case where the mobile phone 2 has phonebook data, the outgoing call history data and the incoming call history data include the above-described registered name. Specifically, when the incoming phone number received from the base station 40 is the phone number registered in the phonebook data, the mobile phone 2 checks whether the registered name for this phone number is registered in the phonebook data. In a case where the registered name exists, the incoming call history data includes the phone number, incoming call date/time, and the registered name. The missed call history data also includes a phone number, an incoming call date/time, and its registered name as a result of similar processing. The mobile phone 2 also checks the outgoing call history data to see whether the phone number used in the outgoing call processing is the phone number registered in the phonebook data. In a case where the phone number is registered in the phonebook data, the outgoing call history data includes the outgoing call date/time, the outgoing phone number, and the registered name.

The user can select one phone number read from the phonebook data by the mobile phone 2 and make a call, leading to proper establishment of a call with simple operation without a need to input all the number keys corresponding to the numbers constituting the phone number one by one. The mobile phone 2 can store the most recent 20 cases of each of outgoing call history data, incoming call history data, and missed call history data. The mobile phone 2 automatically erases the oldest data every time the outgoing call processing, incoming call processing, or missed call processing is performed so as to update the outgoing call history data, incoming call history data, and missed call history data. The mobile phone 2 conforms to a well-known HFP for making hands-free calls and with a PBAP for the transfer of the phonebook data and incoming/outgoing call history data.

In a case where the mobile phone 2 conforms to PBAP that regulates automatic transfer of incoming/outgoing call history data, the mobile phone 2 makes a PBAP connection immediately after establishment of a communication channel with the Bluetooth communication unit 13, automatically transfers the phonebook data stored at that point, and furthermore, automatically transfers the outgoing call history data, incoming call history data, and missed call history data stored at that point. With this configuration, in a case where the hands-free device 1 is present within the Bluetooth communication range, the mobile phone 2 automatically transfers, to the hands-free device 1, data such as a maximum of 20 cases of outgoing call history data stored after independently executing outgoing call processing in the past, a maximum of 20 cases of incoming call history data stored after independently executing incoming call processing in the past, or a maximum of 20 cases of missed call history data stored after independently executing missed call processing in the past.

In the present embodiment, the outgoing call history data, the incoming call history data, and the missed call history data are collectively referred to as history data.

The operation unit 14 of the hands-free device 1 is an operation means according to the present embodiment that is used by the user for operation. Actualized by a touch key formed on the display unit 15, for example, the operation unit 14 detects the user's operation, and outputs an operation signal indicating the operation content to the control unit 12. The display unit 15 is a display means according to the present embodiment. When a display signal is input from the control unit 12, the display unit 15 displays a display screen based on the input display signal, for example, a display screen on which dialing keys corresponding to "0" to "9" are arranged, as a display screen on which the user inputs a phone number. The display unit 15 is, for example, a liquid crystal display or an organic Electro Luminescence (EL) display, but is not limited thereto.

The working memory 16 represents an outgoing call history data storage means, an incoming call history data storage means, and a data storage means according to the present embodiment, and is formed of volatile memory. The working memory 16 stores outgoing call history data, incoming call history data, missed call history data, and phonebook data automatically transferred from the mobile phone 2 without any operation by the user. In this case, the working memory 16 can store, for example, five sets of each of the outgoing call history data, incoming call history data, and missed call history data. The working memory 16 is formed of Random Access Memory (RAM), for example.

The storage memory 17 is formed of non-volatile memory and stores various types of data. The storage memory 17 is represented by Read Only Memory (ROM), for example. Furthermore, the storage memory 17 may be a writable storage medium such as a Hard Disk Drive (HDD) or a flash drive.

When the user makes an outgoing call history data display request on the operation unit 14, the control unit 12 controls to display, on the display unit 15, the outgoing call history data stored in the working memory 16. When the user makes an incoming call history data display request on the operation unit 14, the control unit 12 controls to display, on the display unit 15, the incoming call history data stored in the working memory 16. When the user makes a phonebook data display request on the operation unit 14, the control unit 12 controls to display, on the display unit 15, the phonebook data stored in the working memory 16. As described above, in the hands-free device 1 of the present embodiment, the number of sets of the outgoing call history data and the incoming call history data to be stored in the working memory 16 are five for each. Accordingly, the maximum number of sets of data displayed on the display unit 15 is five for each as well. The number of sets of data to be stored in the working memory 16 is an example, and is not limited to the above example.

The microphone 18 is a voice input means to input voice, and is used to input voice uttered by a user when making a hands-free call using the mobile phone 2. The speaker 19 is a voice output means, and outputs the transmitted voice of the other party when making a hands-free call using the mobile phone 2. That is, when a Bluetooth communication channel is established between the Bluetooth communication unit 13 and the mobile phone 2 so as to establish HFP-based wireless communication, the control unit 12 controls to transmit the voice input by the microphone 18 from the Bluetooth communication unit 13 to the mobile phone 2 so as to be transmitted from the mobile phone 2 to the mobile phone network. At the same time, the control unit 12 controls such that the voice received by the mobile phone 2 from the mobile phone network is to be transmitted from the mobile phone 2 to be received by the Bluetooth communication unit 13 so as to output the voice from the speaker 19.

In addition to the illustrated functional blocks, the hands-free device 1 described above may have functional blocks needed for navigation operation, such as: a GPS device as a current position detector that detects the current position of an own vehicle; a route searcher that searches for a route from the current position to the destination; a map data reader that reads map data from a recording medium that records map data; a VICS (registered trademark) information receiver that receives VICS information distributed from the VICS center; and a voice recognition unit that recognizes user's uttered voice. In this case, the hands-free device 1 may extract GPS date/time information from GPS radio signals received by the GPS device from GPS satellites so as to acquire the date/time, and may use the acquired date/time as the outgoing call date/time or the incoming call date/time.

The hands-free device 1 described above is configured to start/stop in conjunction with the on/off states of an ACC switch (a switch that turns on/off the power supply to the vehicle equipment). The hands-free device 1 operates such that, when the ACC switch is switched from on to off in response to user's operation, the power supply will be stopped to result in a shift of device power from on to off. In this case, various types of data stored in the storage memory 17 immediately before the transition will not be erased (data remains stored and retained). However, the outgoing call history data, the incoming call history data, and the missed call history data and the phonebook data stored in the working memory 16 immediately before the transition will be erased.

Figure 3:
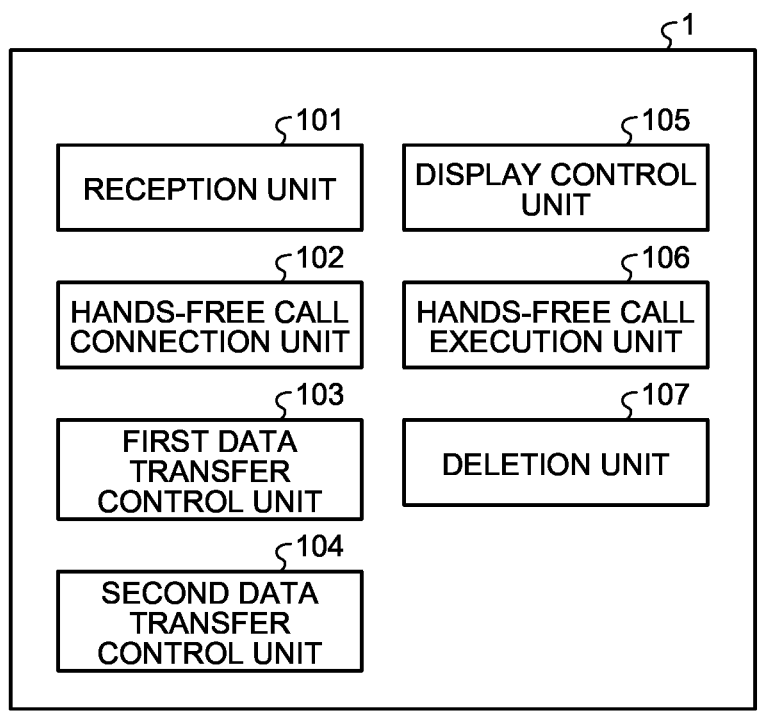
FIG. 3 is a diagram illustrating an example of a function of a hands-free device according to an embodiment.

Next, details of the function of the hands-free device 1 of the present embodiment will be described. FIG. 3 is a diagram illustrating an example of the functions of the hands-free device 1 according to the present embodiment. As illustrated in FIG. 3, the hands-free device 1 of the present embodiment includes: a reception unit 101; a hands-free call connection unit 102; a first data transfer control unit 103; a second data transfer control unit 104; a display control unit 105; a hands-free call execution unit 106; and a deletion unit 107. When the first data transfer control unit 103 and the second data transfer control unit 104 are not particularly distinguished, they are simply referred to as a data transfer control unit.

The reception unit 101, the hands-free call connection unit 102, the first data transfer control unit 103, the second data transfer control unit 104, the display control unit 105, the hands-free call execution unit 106, and the deletion unit 107 are actualized when the control units 12 reads a program from the storage memory 17 and executes it. The functions illustrated in FIG. 3 is an example, and the control unit 12 of the hands-free device 1 may implement still other functions.

The reception unit 101 receives various operations from the user. For example, when the user operates the operation unit 14, the reception unit 101 receives the user's operation via the operation unit 14.

For example, the reception unit 101 receives an operation of deleting the history data and the phonebook data transferred from the mobile phone 2 from the user. In addition, the reception unit 101 receives an operation of deleting the history data and the phonebook data transferred from the mobile phone 2 by the user on a confirmation screen described below. In a case where the reception unit 101 has received these operations related to the deletion of data, the reception unit 101 notifies the deletion unit 107 that the operation has been received.

The hands-free call connection unit 102 connects to the mobile phone 2 to enable a hands-free call, based on the HFP. More specifically, the hands-free call connection unit 102 controls the Bluetooth communication unit 13 to connect to the mobile phone 2 to enable a hands-free call.

The first data transfer control unit 103 uses a PBAP-based communication protocol to receive, from the mobile phone 2, at least one of the outgoing call history data, the incoming call history data, the missed call history data, and the phonebook data, stored in the mobile phone 2. In the present embodiment, the first data transfer control unit 103 is supposed to receive all of the outgoing call history data, the incoming call history data, the missed call history data, and the phonebook data from the mobile phone 2.

The first data transfer control unit 103 stores the outgoing call history data, the incoming call history data, the missed call history data, and the phonebook data received from the mobile phone 2, in the working memory 16. In a case where the storage memory 17 is a writable storage medium such as an HDD or a flash drive, the first data transfer control unit 103 may store the outgoing call history data, the incoming call history data, the missed call history data, and the phonebook data received from the mobile phone 2, in the storage memory 17.

The second data transfer control unit 104 receives, from the mobile phone 2, other data stored in the mobile phone 2. Other data represents data used in the hands-free device 1 among data other than the outgoing call history data, the incoming call history data, the missed call history data, and the phonebook data.

In the present embodiment, other data includes a point search history, route information, search word history, music list, or the like, as illustrated in FIG. 2. Other data may include all of these, or may be a part of these data.

An example of the point search history is a search result in a map application. Furthermore, the route information is a traveling route of the mobile phone 2 in a case where the mobile phone 2 has been used as a car navigation system in the past. The search word history is a history of words searched by accessing search engines from the mobile phone 2. The music list is a list of music played by the user on the mobile phone 2. The other data may be data other than the data illustrated in FIG. 2.

For example, the second data transfer control unit 104 controls the Bluetooth communication unit 13 to receive other data stored in the mobile phone 2 and stores received message memo data or voice mail data in the working memory 16. In a case where the storage memory 17 is a writable storage medium such as an HDD or a flash drive, the second data transfer control unit 104 may store other data received from the mobile phone 2 in the storage memory 17.

The display control unit 105 controls to display various screens on the display unit 15. For example, the display control unit 105 controls to display, on the display unit 15, a display screen in which dialing keys are arranged as a display screen on the user can input a phone number. Furthermore, the display control unit 105 controls to display, on the display unit 15, the outgoing call history data, the incoming call history data, or the phonebook data, in accordance with the user's operation received by the reception unit 101.

Furthermore, the display control unit 105 displays, on the display unit 15, a setting screen in which a user can set predetermined conditions regarding data deletion by the deletion unit 107, which will be described below.

Figure 4:
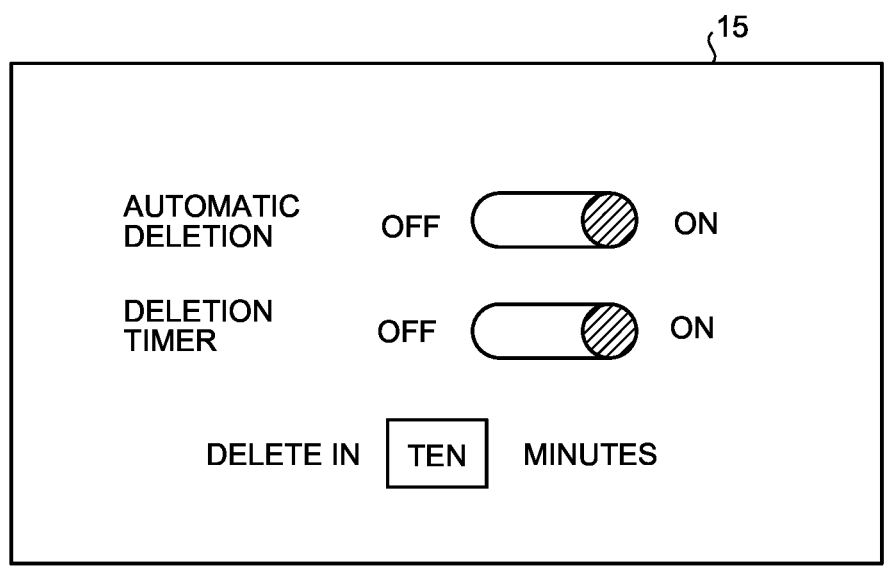
FIG. 4 is a diagram illustrating an example of a setting screen according to an embodiment.

FIG. 4 is a diagram illustrating an example of a setting screen according to the present embodiment. As illustrated in FIG. 4, the setting screen according to the present embodiment can be used to set, by the user, on/off of the automatic deletion of the data transferred from the mobile phone 2, and on/off of the deletion timer when the automatic deletion is "on". Deletion target data includes at least history data and phonebook data. In addition, other data transferred from the mobile phone 2 may also be the deletion target data.

Furthermore, while the setting screen illustrated in FIG. 4 assumes that the setting time of the deletion timer can be set by the user, the setting time of the deletion timer may be set beforehand. The content set by the user on this setting screen is received by the reception unit 101 and is transferred to the deletion unit 107. In addition, the reception unit 101 stores the content set by the user on the setting screen in the storage memory 17, for example. The setting time of the deletion timer is an example of a predetermined time in the present embodiment.

In the setting screen illustrated in FIG. 4, the automatic deletion setting and deletion timer setting are performed for all the deletion target data. However, the automatic deletion setting and deletion timer setting may be performed for individual types of data.

Furthermore, the display control unit 105 may display, on the display unit 15, a screen on which the user can individually select the data as an erasing target. For example, in a case where the user has a desire to delete the phonebook data and to keep the history data of incoming/outgoing calls in the hands-free device 1 without deletion, it is allowable to configure such that the user can set whether to automatically delete individual data.

In addition, the display control unit 105 displays, on the display unit 15, a deletion screen on which manual deletion of data is executable in response to user's operation. By executing the data deletion operation on the deletion screen, the user can delete the data at any timing. The reception unit 101 notifies the deletion unit 107 in a case where the user has manually deleted the data on the deletion screen.

Returning to FIG. 3, the hands-free call execution unit 106 executes a hands-free call when the mobile phone 2 with which the HFP connection is established by the hands-free call connection unit 102 has received a call. For example, the hands-free call execution unit 106 receives the transmitted voice of the other party received by the mobile phone 2 via the Bluetooth communication unit 13, and outputs the received voice from the speaker 19. Furthermore, the hands-free call execution unit 106 controls to transmit the voice input to the microphone 18 by the user of the hands-free device 1 from the Bluetooth communication unit 13 to the mobile phone 2 and controls to transfer the voice from the mobile phone 2 to the mobile phone network.

In a case where a predetermined condition is satisfied, the deletion unit 107 deletes the data transferred from the mobile phone 2 from the working memory 16 and the storage memory 17. The deletion target may include only the history data and the phonebook data. Alternatively, other data transferred from the mobile phone 2 may also be the deletion target. Furthermore, not only the data transferred from the mobile phone 2 but also the data input from the operation unit 14 of the hands-free device 1 may be a deletion target.

Although the deletion method is not particularly limited, the deletion unit 107 is supposed to erase the data so that the data cannot be restored, for example.

The predetermined conditions differ depending on whether the automatic deletion is set, whether the deletion timer is set, the state of the vehicle 3, the communication connection state between the hands-free device 1 and the mobile phone 2, and presence/absence of manual deletion operation. Hereinafter, in the present embodiment, predetermined conditions are referred to as deletion conditions.

FIG. 5 is a table illustrating an example of a relationship between the automatic deletion setting, deletion timer setting, the state of the vehicle 3, communication connection states between the hands-free device 1 and the mobile phone 2, and the presence/absence of manual deletion operation, according to the present embodiment.

For example, as illustrated in Pattern 1 of FIG. 5, the deletion condition in a case where the automatic deletion setting is "on" and the deletion timer setting is "off" will be; "Engine turns on after engine turns off on vehicle 3, "After disconnecting Bluetooth (BT) connection with mobile phone 2, Bluetooth connection is established again with the same mobile phone 2", "After disconnecting the Bluetooth (BT) connection with the mobile phone 2, Bluetooth connection is re-established with a further mobile phone 2", or "Receiving manual deletion operation by the user". Note that turning the engine off means turning the ignition power off. The "set time" in FIG. 5 is the set time for the deletion timer described in FIG. 4.

Furthermore, for example, as illustrated in Pattern 2 of FIG. 5, the deletion condition in a case where the automatic deletion setting is "on" and the deletion timer setting is "on" will be: "Engine turns on after lapse of set time or more from the time engine turns off on vehicle 3"; "After lapse of set time or more from disconnecting Bluetooth (BT) connection with mobile phone 2, Bluetooth connection is re-established with the same mobile phone 2"; "After disconnecting the Bluetooth (BT) connection with the mobile phone 2, Bluetooth connection is re-established with a further mobile phone 2"; or "Receiving manual deletion operation by the user".

Here is an exemplary case where the automatic deletion setting is "on" and the deletion timer setting is "on". In this case, even when the engine of vehicle 3 is turned off, data would not be deleted in a case where the engine is turned on again before the lapse of the set time. In another case where the Bluetooth connection with the mobile phone 2 is disconnected, the data would not be deleted in a case where the Bluetooth connection with the same mobile phone 2 is re-established before the lapse of the set time.

That is, in the case where the deletion timer is set to "on", there is a time allowance by the length of the set time, as compared with the case where the deletion timer is set to "off". Therefore, for example, even when the driver of the vehicle 3 turns off the engine of the vehicle 3 for shopping at a convenience store for a short time, the data would be retained without being deleted when the engine is turned on again within a set time. In addition, even when the Bluetooth connection with the mobile phone 2 is disconnected in situations where the driver of the vehicle 3 turns off the power of the mobile phone 2 for a short time or goes out of the vehicle with the mobile phone 2, data will be retained without being deleted when the same mobile phone 2 connects to the hands-free device 1 via Bluetooth before the lapse of the set time.

However, even when the deletion timer is set to "on", the deletion unit 107 will delete the data in a case where the Bluetooth connection with the mobile phone 2 is disconnected and thereafter the Bluetooth connection is established with another mobile phone 2. Furthermore, when the manual deletion operation is performed by the user, the deletion unit 107 will delete the data regardless of the automatic deletion setting or the deletion timer setting.

Furthermore, for example, as illustrated in Pattern 3 of FIG. 5, when the automatic deletion setting is "off", the deletion condition will be manual deletion alone. The deletion timer setting is a timer setting related to the execution timing of automatic deletion. Accordingly, when the automatic deletion setting is "off", the deletion timer setting will be automatically turned "off".

In the example illustrated in FIG. 5, setting has been made such that, when the automatic deletion setting is "on" and the deletion timer setting is "off", data will be deleted after disconnection of Bluetooth communication with the mobile phone 2 in both cases where the Bluetooth connected mobile phone 2 is same as or different from the mobile phone 2 before disconnection. Alternatively, however, the deletion unit 107 may be configured not to delete data after disconnection of Bluetooth communication with the mobile phone 2 in a case where the Bluetooth connected mobile phone 2 is the same as the mobile phone 2 before the disconnection.

Furthermore, it is allowable to configure such that, in a case where the automatic deletion setting is "on" and the deletion timer setting is "off", the deletion unit 107 will delete the data after disconnecting the Bluetooth connection with the mobile phone 2 without waiting for the next Bluetooth connection.

Furthermore, the above-described deletion condition is an AND condition. Therefore, when any of the conditions is satisfied, the deletion unit 107 will delete the data. The deletion conditions illustrated in FIG. 5 are examples, and are not limited to these.

Next, operations related to the above configuration will be described. In the present embodiment, it is supposed to have a configuration in which the mobile phone 2 has retained (stored) 20 sets of outgoing call history data being the maximum storable number, 20 sets of incoming call history data being the maximum storable number, and 20 sets of missed call history data being the maximum storable number, and a user carrying the mobile phone 2 in this state approaches and gets into the vehicle 3, turning on the above ACC switch to allow the mobile phone 2 to enter the Bluetooth communication range of the hands-free device 1.

First, a procedure that the control unit 12 of the hands-free device 1 uses to receive outgoing call history data, incoming call history data, missed call history data, phonebook data, message memo data, and voice mail data from the mobile phone 2 will be described. The user has preliminarily registered, on the hands-free device 1, the mobile phone 2 to be the other party of the Bluetooth communication.

For example, the user inputs a 4-digit password for each of mobile phones 2 into the hands-free device 1 at the time of initial communication setting. The hands-free device 1 and the mobile phone 2 generate a link key used for connecting to each other and retain the link key. The hands-free device 1 performs authentication of the link key at the time of initial connection to select the mobile phone 2 to be connected in communication. That is, the hands-free device 1 and the unregistered mobile phone would not be connected in HFP-based communication or PBAP-based communication. Basically, the mobile phone 2 possessed by the owner of the vehicle 3 is preliminarily registered, and Bluetooth communication will be performed between the registered mobile phone 2 and the hands-free device 1. The above method is an example of preliminary registration of the mobile phone 2 used in the communication with the hands-free device 1, and is not limited to this.

The present example assumes that a plurality of mobile phones 2 to be connected in the communication are registered in the hands-free device 1. Furthermore, for example, the user operates the operation unit 14 to preset the priority for the plurality of mobile phones 2, and the working memory 16 or the storage memory 17 stores the preset priority. For example, since there is a case where the driver owns a plurality of mobile phones 2, it is possible to register the plurality of mobile phones 2 to the hands-free device 1 in this manner.

Figure 6:
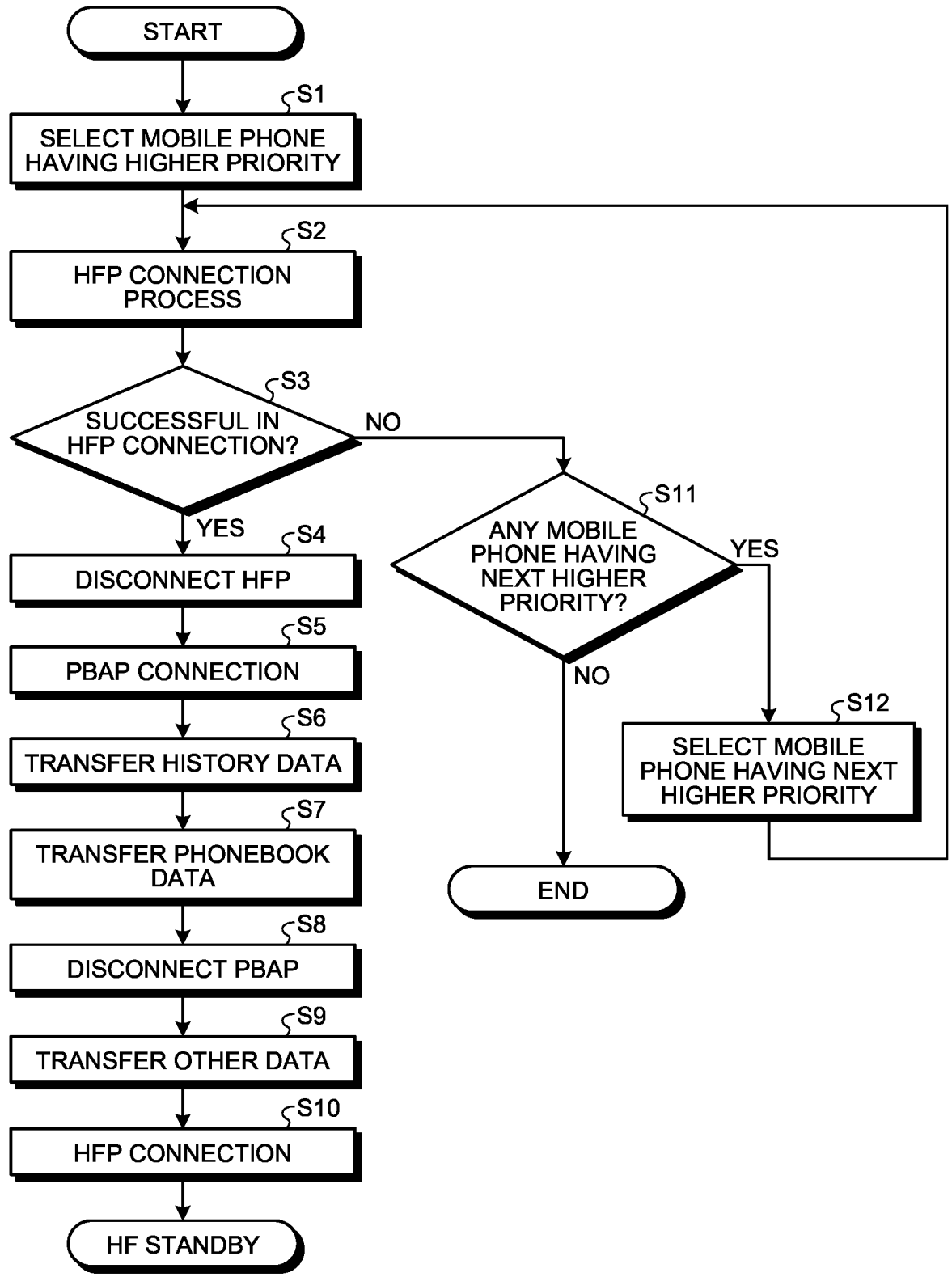
FIG. 6 is a diagram illustrating an example of a flow of a data transfer process according to an embodiment.

FIG. 6 is a diagram illustrating an example of the flow of a data transfer process according to the present embodiment. More specifically, the process of this flowchart is an initial data transfer process executed when the hands-free device 1 connects to the mobile phone 2.

First, the hands-free call connection unit 102 selects the mobile phone 2 having the higher priority as the communication connection target for wireless communication in HFP (S1). Here, in the present example, initial HFP-based communication is automatically attempted and the connection is started without establishing a connection in PBAP-based communication.

Next, the hands-free call connection unit 102 executes a process of automatically establishing an initial connection in the HFP-based communication to the selected mobile phone 2 (S2). In addition, the hands-free call connection unit 102 determines whether the connection in HFP-based wireless communication is successful (S3).

When the hands-free call connection unit 102 determines that the connection in the HFP-based wireless communication is successful (S3 "YES"), the hands-free call connection unit 102 automatically disconnects the established HFP-based wireless communication (S4).

Subsequently, the first data transfer control unit 103 automatically establishes a PBAP-based wireless communication to the mobile phone 2 that has successfully connected in the HFP-based wireless communication (S5).

Next, the first data transfer control unit 103 transmits a history data transfer request to the mobile phone 2 so as to start the transfer process of the outgoing call history data, the incoming call history data, and the missed call history data (S6).

Having received the history data transfer request, the mobile phone 2 transfers the outgoing call history data, the incoming call history data, and the missed call history data to the hands-free device 1 in PBAP-based Bluetooth communication. The first data transfer control unit 103 stores the outgoing call history data, the incoming call history data, and the missed call history data transferred from the mobile phone 2 in the working memory 16 or the storage memory 17.

Having finished the transfer process of the history data, the first data transfer control unit 103 transmits to the mobile phone 2 a phonebook data transfer request so as to start the phonebook data transfer process (S7).

Having received the phonebook data transfer request, the mobile phone 2 transfers the phonebook data to the hands-free device 1 by PBAP-based Bluetooth communication. The first data transfer control unit 103 stores the phonebook data transferred from the mobile phone 2 in the working memory 16 or the storage memory 17.

When the transfer process of the phonebook data is completed, the first data transfer control unit 103 disconnects the PBAP-based wireless communication with the mobile phone 2 (S8).

Next, the second data transfer control unit 104 transmits, to the mobile phone 2, a message memo data transfer request to start a process of transferring other data, that is, data other than history data or phonebook data to the mobile phone 2, as transfer target data to the hands-free device 1 (S9).

Having received the request for transferring other data, the mobile phone 2 transfers the other data to the hands-free device 1 in Bluetooth communication. The second data transfer control unit 104 stores other data transferred from the mobile phone 2 in the working memory 16 or the storage memory 17.

Note that the Bluetooth communication unit 13 is supposed to perform communicate with the mobile phone 2 without using the HFP and the PBAP in the transfer process for other data. The protocol used for the process of transferring other data is not particularly limited.

Next, the hands-free call connection unit 102 automatically re-establishes HFP-based wireless communication with the mobile phone 2 (S10).

After the HFP-based wireless communication with the mobile phone 2 is established, the hands-free call connection unit 102 shifts to a hands-free (HF) standby process. During the period of execution of the hands-free standby process, the hands-free device 1 is in a state where incoming or outgoing calls via the mobile phone 2 are enabled. The hands-free standby process continues until the power of the hands-free device 1 is disconnected or the HFP-based wireless communication with the mobile phone 2 is canceled. The state where the HFP-based wireless communication with the mobile phone 2 is canceled includes a state where the user performs an operation of canceling connection onto the hands-free device 1 or the mobile phone 2, or where the mobile phone 2 leaves the Bluetooth communication range of the hands-free device 1, for example.

In this manner, in the present embodiment, wireless communication is automatically switched serially in the order of HFP→PBAP→HFP. This makes it possible to reliably and stably perform the communication process for mobile phones that conform to HFP-based wireless communication and PBAP-based wireless communication supplied by a large number of manufacturers. Furthermore, such a method will make it possible to reduce the complexity of software processing in the hands-free device 1.

Furthermore, after determining that the HFP-based wireless communication has not succeeded (failed) (S3 "No"), the hands-free call connection unit 102 determines whether the mobile phone 2 having the next highest priority exists (S11).

In a case where the hands-free call connection unit 102 determines that the mobile phone 2 having the next highest priority exists (S11 "Yes"), the hands-free call connection unit 102 selects the mobile phone 2 having the next highest priority as a connection target for wireless communication. (S12), returns to S2 described above, and repeats the above process.

Furthermore, when having determined that the mobile phone 2 having the next highest priority does not exist (S11 "No"), the hands-free call connection unit 102 ends the process of this flowchart.

In the processing flow described with reference to FIG. 6, the Bluetooth communication unit 13 of the hands-free device 1 performs serial connection not using simultaneous connection (not using multi-profile connection) for the HFP-based wireless communication, the PBAP-based wireless communication, and the wireless communication for the transfer process of message memo data and voice mail data, which do not use these protocols. The exemplary case illustrated in FIG. 6 would not perform simultaneous execution of wireless communications based on different protocols but selects to perform serial connection for the following three reasons.

(1) Similarly to the hands-free device 1, there is a possibility that, even though the mobile phone 2 as a communication partner conforms to HFP-based wireless communication and PBAP-based wireless communication, the mobile phone 2 is not compatible with simultaneous connection of these.

(2) Although the mobile phone 2 that is the communication partner might conform to HFP-based wireless communication and PBAP-based wireless communication as well as simultaneous connection of these, there is a concern that maintaining the simultaneous connection would complicate the software processing of the Bluetooth communication unit 13 of the hands-free device 1, leading to the concern regarding the stability of the communication connection.

(3) There is a situation in which mobile phones 2 are manufactured by a large number of manufacturers in the world, in which the hands-free device 1 should be required to have a capability of connecting to all mobile phones conforming to HFP-based wireless communication and PBAP-based wireless communication.

However, the flow of connection is not limited to this. For example, the connection flow may be changed according to the specifications of the hands-free device 1 and the mobile phone 2, the connection environment, or the like. For example, the Bluetooth communication unit 13 of the hands-free device 1 may have a simultaneous connection in the HFP-based wireless communication and the PBAP-based wireless communication.

Next, a flow of a process of deleting the data transferred from the mobile phone 2 to the hands-free device 1 will be described. FIGS. 7 to 10 are flowcharts illustrating an example of a flow of a data deletion process according to the present embodiment.

Figure 7:
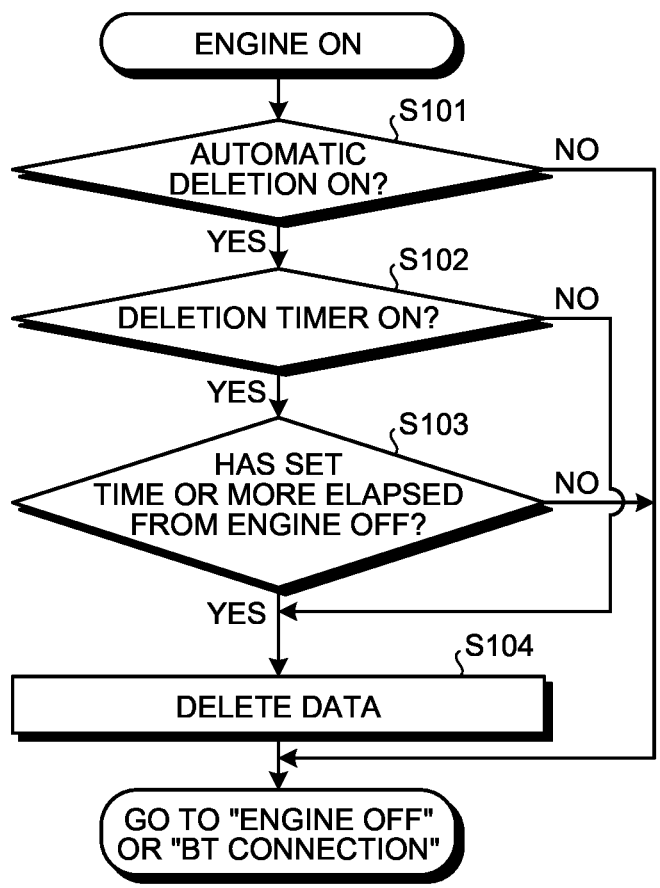
FIG. 7 is a flowchart illustrating an example of a flow of a deletion condition determination process performed when a vehicle engine turns on, according to an embodiment.

FIG. 7 is a flowchart illustrating an example of a flow of a deletion condition determination process performed when an engine of the vehicle 3 turns on, according to the present embodiment. The process of the flowchart of FIG. 7 starts when the engine of the vehicle 3 equipped with the hands-free device 1 is turned on.

First, the deletion unit 107 determines whether the automatic deletion setting is "on" (S101).

When the automatic deletion setting is "on" (S101 "Yes"), the deletion unit 107 then determines whether the deletion timer setting is "on" (S102).

When the deletion timer is set to "on" (S102 "Yes"), the deletion unit 107 then determines whether the set time or more has elapsed since the engine was turned off (S103). For example, the deletion unit 107 calculates a difference between the time when the engine was turned off last time and the current time. When the difference is a set time or more, the deletion unit 107 determines that the set time or more has elapsed since the engine was turned off. The time when the engine was turned off last time is stored in the storage memory 17 by the deletion unit 107, for example. The method for determining the elapsed time is not limited to this, and a known method can be applied.

When it is determined that the set time or more has passed since the engine was turned off (S103 "Yes"), the deletion unit 107 deletes the data transferred from the mobile phone 2 from the working memory 16 and the storage memory 17 (S104). The process proceeds to the process of "engine OFF" described in FIG. 9 below or "Bluetooth (BT) connection" described in FIG. 8 below.

In a case where it is determined that the set time has not passed since the engine was turned off (S103 "No"), the deletion unit 107 proceeds to the process of "engine off" or "Bluetooth (BT) connection" without deleting the data.

In a case where the automatic deletion setting is "off" (S101 "No"), the deletion unit 107 proceeds to the process of "engine OFF" or "Bluetooth (BT) connection" without deleting the data.

In a case where the deletion timer is set to "off" (S102 "No"), the deletion unit 107 proceeds to the process of S104 and deletes the data, regardless of the elapsed time.

Figure 8:
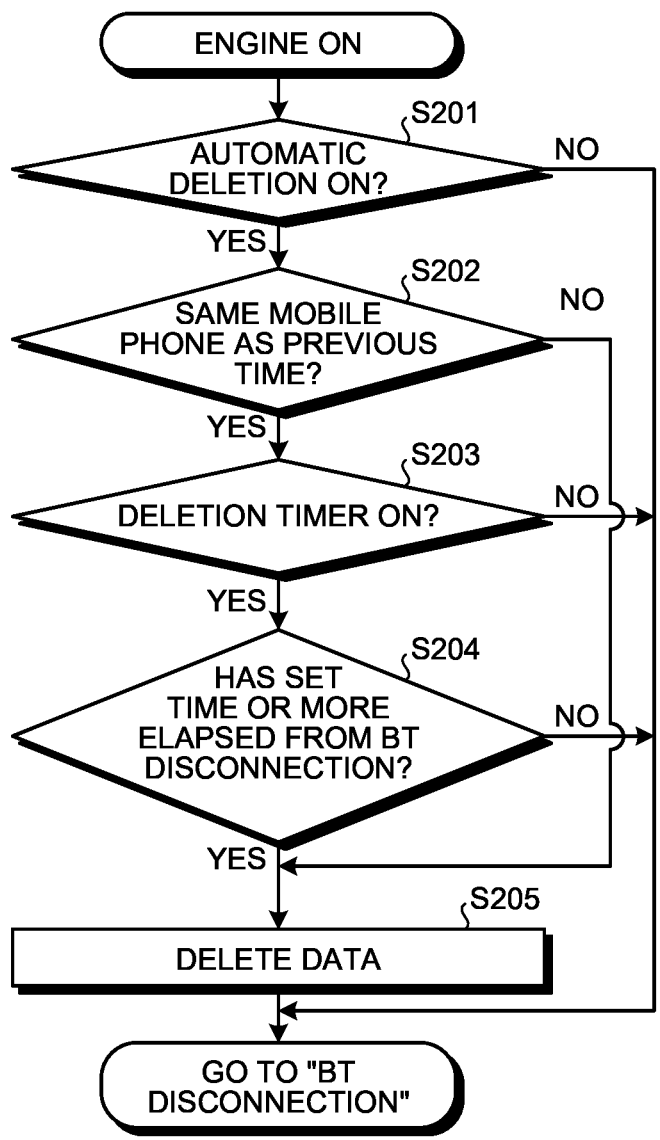
FIG. 8 is a flowchart illustrating an example of a flow of a deletion condition determination process when a hands-free device according to an embodiment is connected to a mobile phone via Bluetooth.

FIG. 8 is a flowchart illustrating an example of a flow of a deletion condition determination process when the hands-free device 1 according to the present embodiment is connected to the mobile phone 2 via Bluetooth. The process of this flowchart is executed when the hands-free device 1 is connected to the mobile phone 2 via Bluetooth. In this case, the Bluetooth connection that triggers the process may be other than the HFP connection or the PBAP connection.

First, the deletion unit 107 determines whether the automatic deletion setting is "on" (S201).

When the automatic deletion setting is "on" (S201 "Yes"), the deletion unit 107 determines whether the mobile phone 2 connected to the hands-free device 1 via Bluetooth is the same mobile phone 2 as the mobile phone 2 previously connected via Bluetooth (S202).

In a case where it is determined that the connected mobile phone 2 is the same mobile phone 2 as the previously connected mobile phone 2 (S202 "Yes"), the deletion unit 107 determines whether the deletion timer setting is "on" (S203).

When the deletion timer is set to "on" (S203 "Yes"), the deletion unit 107 determines whether the set time or more has passed since the Bluetooth (BT) connection with the mobile phone 2 is disconnected (S204).

When it is determined that the set time or more has passed since the Bluetooth connection with the mobile phone 2 is disconnected (S204 "Yes"), the deletion unit 107 deletes the data transferred from the mobile phone 2 from the working memory 16 and the storage memory 17 (S205). Subsequently, the process proceeds to the process of "Bluetooth (BT) disconnection" described with reference to FIG. 10 below. In a case where the engine is turned off, the Bluetooth connection between the hands-free device 1 and the mobile phone 2 is disconnected. Therefore, after the flowchart illustrated in FIG. 8 is completed, the process will not directly proceed to the "engine OFF" process in FIG. 9.

In a case where it is determined that the set time has not passed since the Bluetooth connection with the mobile phone 2 is disconnected (S204 "No"), the deletion unit 107 proceeds to the process of "Bluetooth (BT) disconnection" without deleting the data.

In a case where the automatic deletion setting is "off" (S201 "No"), the deletion unit 107 proceeds to the process of "Bluetooth (BT) disconnection" without deleting the data.

In a case where it is determined that the connected mobile phone 2 is a mobile phone 2 different from the previously connected mobile phone 2 (S202 "Yes"), or where the deletion timer setting is "off" (S203 "No"), the deletion unit 107 proceeds to the process of S205 and deletes the data.

Figure 9:
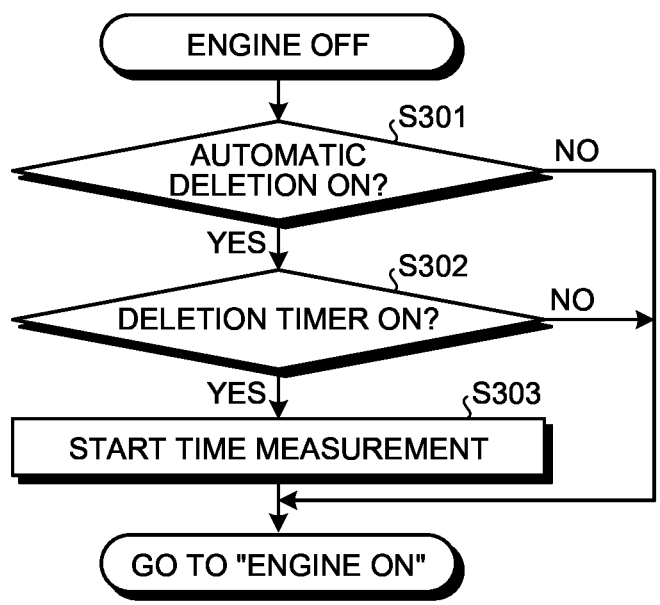
FIG. 9 is a flowchart illustrating an example of a flow of a process performed when a vehicle engine turns off, according to an embodiment.

FIG. 9 is a flowchart illustrating an example of a flow of a process performed when an engine of the vehicle 3 turns off, according to the present embodiment. The process of the flowchart of FIG. 9 starts when the engine of the vehicle 3 equipped with the hands-free device 1 is turned off. Even when the engine of the vehicle 3 is turned off, it is assumed that the power supply for the hands-free device 1 will not be turned off immediately, and the process illustrated in FIG. 9 can be executed.

First, the deletion unit 107 determines whether the automatic deletion setting is "on" (S301).

In a case where the automatic deletion setting is "on" (S301 "Yes"), the deletion unit 107 then determines whether the deletion timer setting is "on" (S302).

When the deletion timer is set to "on" (S302 "Yes"), the deletion unit 107 then starts measuring the time since the engine of the vehicle 3 was turned off (S303).

The method of measuring time is not particularly limited. For example, the deletion unit 107 may continue measurement of the elapsed time even after the engine of the vehicle 3 is turned off. In this case, the hands-free device 1 may continue starting operation using a battery mounted on the vehicle 3 as a power source. Alternatively, the deletion unit 107 may store the engine turn-off time of the vehicle 3 in the storage memory 17.

The process proceeds to the "engine ON" process described in FIG. 7. Next, when the engine of the vehicle 3 is turned on, the process described with reference to FIG. 7 will be executed.

Moreover, when the automatic deletion setting is "off" (S301 "No") or the deletion timer setting is "off" (S302 "No"), the process also proceeds to the "engine ON" process.

Figure 10:
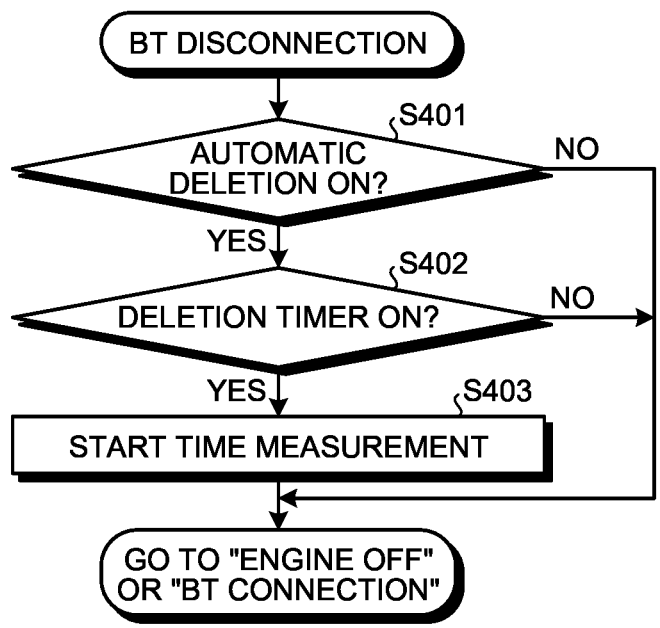
FIG. 10 is a flowchart illustrating an example of a flow of a process when the Bluetooth connection between a hands-free device according to an embodiment with a mobile phone is disconnected.

FIG. 10 is a flowchart illustrating an example of a flow of a process when the Bluetooth connection between the hands-free device 1 according to the present embodiment with the mobile phone 2 is disconnected. The process of this flowchart is executed when the Bluetooth connection between the hands-free device 1 and the mobile phone 2 is disconnected.

First, the deletion unit 107 determines whether the automatic deletion setting is "on" (S401).

In a case where the automatic deletion setting is "on" (S401 "Yes"), the deletion unit 107 then determines whether the deletion timer setting is "on" (S402).

When the deletion timer is set to "on" (S402 "Yes"), the deletion unit 107 then starts measuring the time since the Bluetooth connection is disconnected (S403).

The process proceeds to the process of "engine OFF" described in FIG. 9 or "Bluetooth (BT) connection" described in FIG. 8.

Moreover, when the automatic deletion setting is "off" (S401 "No") or when the deletion timer setting is "off" (S402 "No"), the process also proceeds to the process of "Engine OFF" or "Bluetooth (BT) connection".

Furthermore, the transfer process of outgoing call history data, incoming call history data, and missed call history data described with reference to FIG. 6 above or the like will be described more specifically.

FIGS. 11A to 11C are diagrams illustrating an example of a correspondence between outgoing call history data and phonebook data according to the present embodiment. More specifically, FIG. 11A is an example of outgoing call history data stored in the mobile phone 2. Furthermore, FIG. 11B is an example of the phonebook data stored in the mobile phone 2. Furthermore, FIG. 11C is an example of outgoing call history data stored or displayed in the hands-free device 1.

FIGS. 12A to 12C are diagrams illustrating an example of a correspondence between incoming call history data and phonebook data according to the present embodiment. More specifically, FIG. 12A is an example of incoming call history data stored in the mobile phone 2. Furthermore, FIG. 12B is an example of the phonebook data stored in the mobile phone 2. Furthermore, FIG. 12C is an example of incoming call history data stored or displayed in the hands-free device 1.

Furthermore, FIGS. 13A to 13C are diagrams illustrating an example of the correspondence between the missed call history data and the phonebook data according to the present embodiment. More specifically, FIG. 13A is an example of missed call history data stored in the mobile phone 2. FIG. 13B is an example of the phonebook data stored in the mobile phone 2. FIG. 13C is an example of missed call history data stored or displayed in the hands-free device 1.

The first data transfer control unit 103 receives from the mobile phone 2 the outgoing call history data including the registered name, the outgoing phone number and the outgoing call date/time illustrated in FIG. 11A, and stores the received data in the working memory 16 or the storage memory 17.

Furthermore, the first data transfer control unit 103 receives from the mobile phone 2 the incoming call history data including the registered name, the incoming phone number, and the incoming call date/time illustrated in FIG. 12A, and stores the received data in the working memory 16 or the storage memory 17.

Furthermore, the first data transfer control unit 103 receives from the mobile phone 2 the missed call history data including the registered name, the missed call phone number, and the missed call date/time illustrated in FIG. 13A, and stores the received data in the working memory 16 or the storage memory 17.

In a case where the registered name is not included in the incoming call history data, the outgoing call history data, and the missed call history data in the mobile phone 2, the first data transfer control unit 103 may associate the phone numbers included in the incoming call history data, the outgoing call history data, and the missed call history data, with the registered names associated with the phone numbers in the phonebook data, and may add the registered names to the incoming call history data, the outgoing call history data, and the missed call history data, so as to be stored in the working memory 16 or the storage memory 17. Having received a display request for outgoing call history data, incoming call history data, and missed call history data, the display control unit 105 controls to display, on the display unit 15, the outgoing call history data, incoming call history data, and missed call history data stored in the working memory 16 or the storage memory 17. That is, the display control unit 105 can control to display, on the display unit 15, the registered name transferred from the mobile phone 2 without retrieving the registered name from the phonebook data stored in the working memory 16 or the storage memory 17.

Note that the incoming call history data, the outgoing call history data, and the missed call history data may be stored in the working memory 16 or the storage memory 17 without including the registered name. In this case, the display control unit 105 associates the phone number included in the incoming call history data, the outgoing call history data, and the missed call history data with the registered name associated with the phone number in the phonebook data, and displays the associated data on the display unit 15.

When the hands-free call connection unit 102 completes the HFP connection process described in S10 of FIG. 6, the user can operate the operation unit 14 on the hands-free device 1 to enable execution of the outgoing call processing and incoming call processing.

Furthermore, after the first data transfer control unit 103 receives the outgoing call history data, the incoming call history data, and the missed call history data from the mobile phone 2 in the initial connection process with the mobile phone 2 described with reference to FIG. 6, there might be cases where new outgoing call processing, new incoming call processing, or new missed call processing are executed on the hands-free device 1 or the mobile phone 2. Thereafter, in a case where the user operates the operation unit 14 to request the display of outgoing call history data, incoming call history data, or missed call history data, the display control unit 105 determines whether registered names corresponding to the outgoing phone number, the incoming phone number, and the missed call phone number that have respectively undergone the new outgoing call processing, incoming call processing, or missed call processing are present in the phonebook data transferred from the mobile phone 2, and when they are present, the display control unit 105 controls to display the registered names on the display unit 15 as illustrated in FIGS. 11C, 12C, and 13C, respectively.

More specifically, here is an exemplary case where the hands-free call connection unit 102 performs outgoing call processing to the phone number of "Ichiro Kato" as new outgoing call processing. In this case, in a case where the registered name of "Ichiro Kato" is registered in the phonebook data, the display control unit 105 retrieves the registered name of "Ichiro Kato" from the phonebook data and controls to display the name on the display unit 15 as illustrated in FIG. 11C. In addition, as new incoming call processing, in a case where there is a call from the phone number of "Ichiro Yoshimoto" and where this incoming phone number is registered in the phonebook data, the display control unit 105 retrieves the registered name of "Ichiro Yoshimoto" from the phonebook data and controls to display the name on the display unit 15 as illustrates in FIG. 12C. In addition, in a case where there is a new missed call from the phone number of "Saburo Watanabe", the display control unit 105 retrieves the registered name of "Saburo Watanabe" from the phonebook data and controls to display the name on the display unit 15 as illustrated in FIG. 13C.

Furthermore, in a case where the display control unit 105 has received a request to display entire history data that collectively displays the outgoing call history data, the incoming call history data, and the missed call history data in a newest-first time order, the display control unit 105 controls, regarding incoming call history data and missed call history data, to display a predetermined number of selected pieces of data including the incoming call history data and the missed call history data with the newer incoming call date/time or missed call date/time from all the data, regardless of whether the incoming phone number or missed call phone number is the same (duplicated). Furthermore, regarding the outgoing call history data, the display control unit 105 controls to display selected most recent outgoing call history data alone, from among the outgoing call history data having the same (duplicated) outgoing phone number.

FIG. 14 is a diagram illustrating an example of outgoing call history data, incoming call history data, missed call history data, and entire history data according to the present embodiment. In the example illustrated in FIG. 14, the outgoing phone number of "Taro Abe" is duplicated. In this case, the display control unit 105 controls to display only the outgoing call history with the most recent outgoing call date/time (outgoing call history data with the outgoing call date/time of 12:15 on August 10) among the outgoing call history of "Taro Abe", while suppressing display of the outgoing call history with outgoing call date/time that is not the most recent.

The following are procedures performed in the hands-free device 1 by the control unit 12 for receiving outgoing call history data, incoming call history data, missed call history data, and phonebook data from the mobile phone 2 and storing the received data, and procedures for making a call using the stored outgoing call history data, incoming call history data, and the missed call history data will be described. Although the outgoing call history data and the incoming call history data will be described here, the similar applies to the missed call history data.

Figure 15:
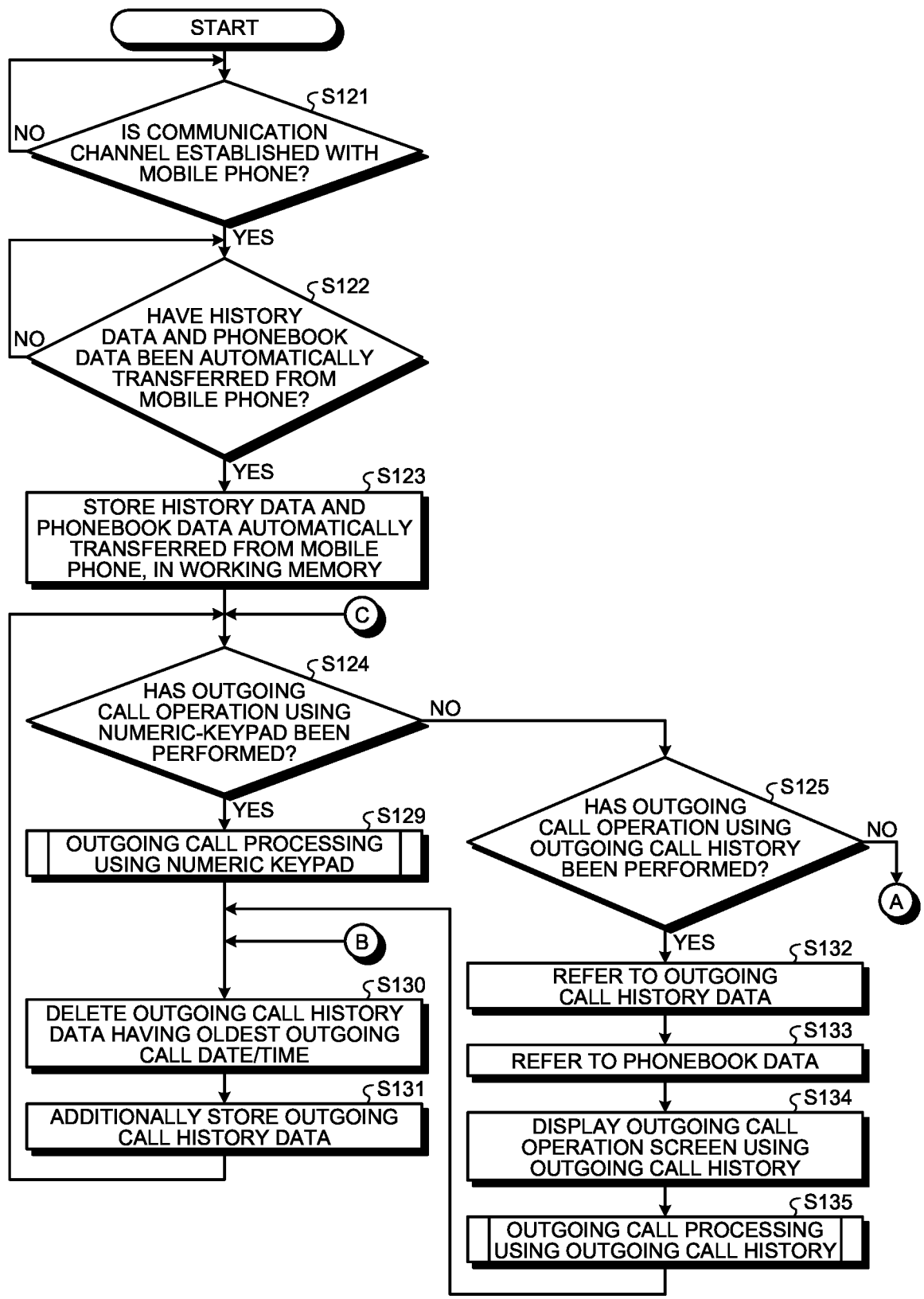
FIG. 15 is a diagram illustrating an example of a flow of a process of making a call using outgoing call history data, incoming call history data, and phonebook data, executed by a hands-free device according to an embodiment.
Figure 16:
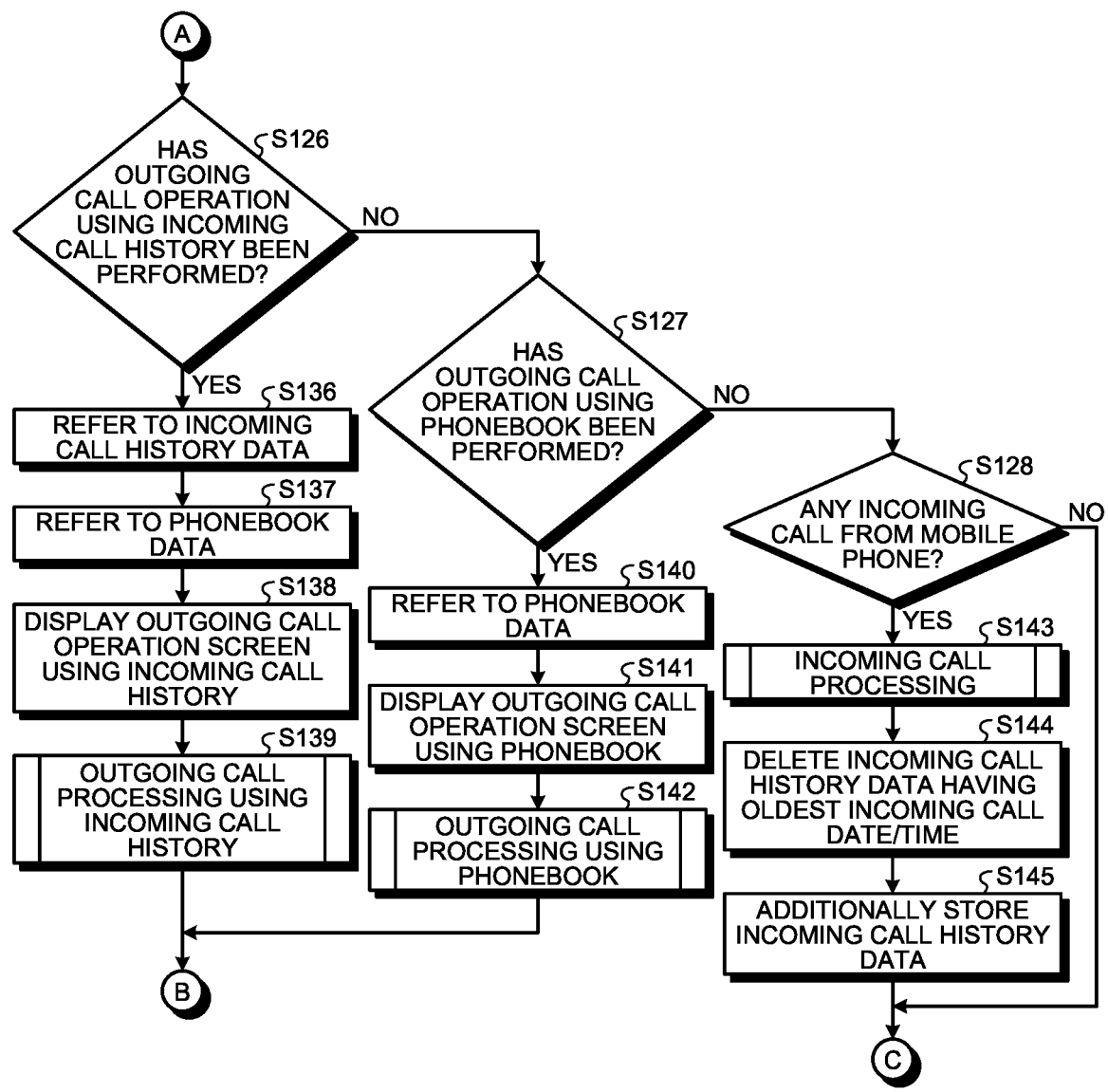
FIG. 16 is a diagram illustrating an example of a flow of a process of making a call using outgoing call history data, incoming call history data, and phonebook data, executed by a hands-free device according to an embodiment.

FIGS. 15 and 16 are diagrams illustrating an example of a flow of a process of making an outgoing call using outgoing call history data, incoming call history data, and phonebook data, executed by the hands-free device 1 according to the present embodiment. The processes executed by the control unit 12 illustrated in FIGS. 15 and 16 are processes actualized by the reception unit 101, the hands-free call connection unit 102, the first data transfer control unit 103, and the second data transfer control unit 104, the display control unit 105, the hands-free call execution unit 106, or the deletion unit 107, described with FIG. 3, for example.

Figure 21:
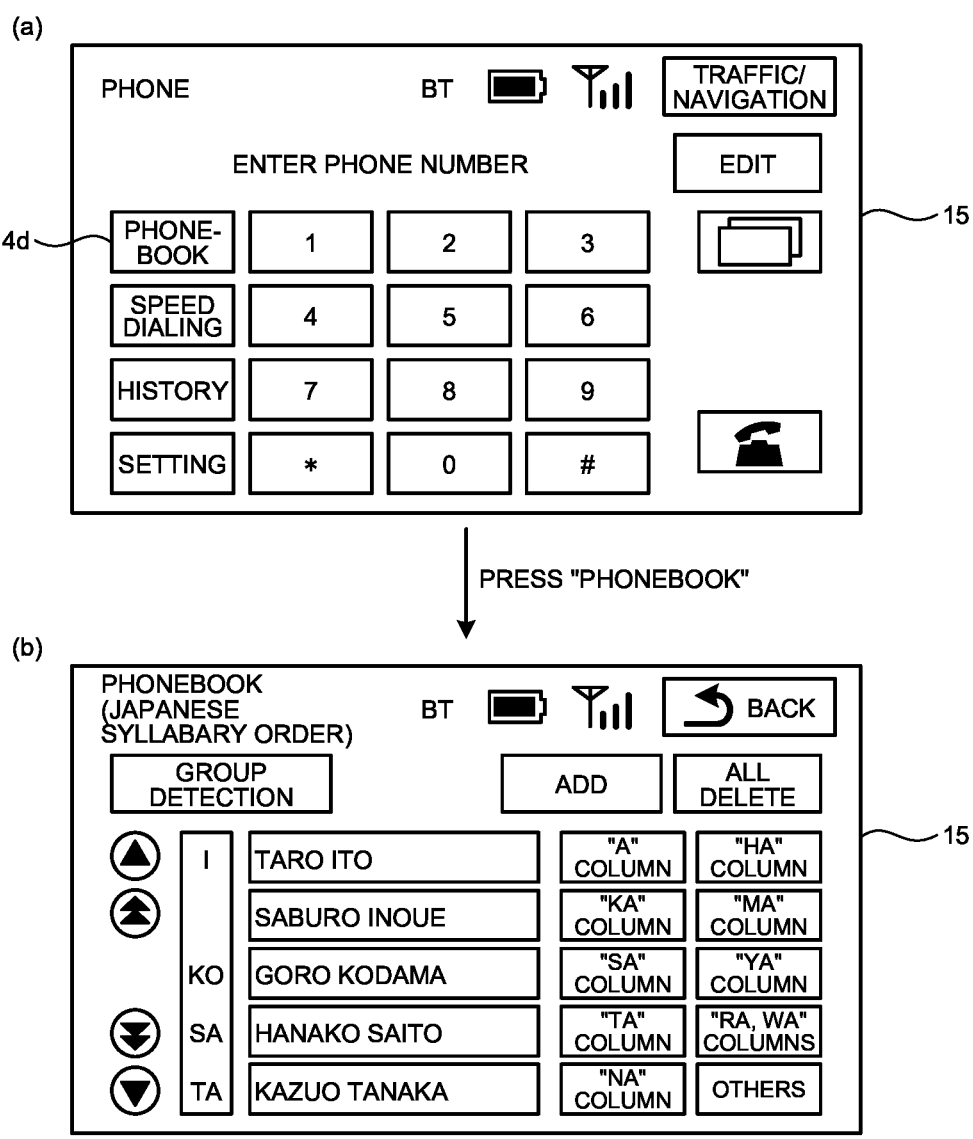
FIG. 21 is a diagram illustrating an example of a transition of a display screen when a user performs an outgoing call operation using a phonebook according to an embodiment.

Here, FIG. 17 described in FIGS. 15 and 16 is a diagram illustrating an example of outgoing call history data according to the present embodiment. Furthermore, FIG. 18 is a diagram illustrating an example of incoming call history data according to the present embodiment. FIG. 19 is a diagram illustrating an example of a transition of a display screen when a user performs an outgoing call operation using an outgoing call history according to the present embodiment. FIG. 20 is a diagram illustrating an example of a transition of a display screen when a user performs an outgoing call operation using an incoming call history according to the present embodiment. Furthermore, FIG. 21 is a diagram illustrating an example of a transition of the display screen when the user performs an outgoing call operation using a phonebook according to the present embodiment. FIG. 22 is a diagram illustrating an example of phonebook data according to the present embodiment.

Returning to the flowchart of FIG. 15, after first determining that the mobile phone 2 exists within a Bluetooth communication range of the hands-free device 1 and that the Bluetooth communication unit 13 has established a communication channel with the mobile phone 2 (S121 "Yes"), the control unit 12 of the hands-free device 1 waits for the outgoing call history data, the incoming call history data, and the phonebook data to be automatically transferred from the mobile phone 2 to the Bluetooth communication unit 13 (S122).

After determining that the outgoing call history data, the incoming call history data, and the phonebook data have been automatically transferred from the mobile phone 2 (S122 "Yes"), the control unit 12 controls such that the outgoing call history data, the incoming call history data, and the phonebook data automatically transferred from the mobile phone 2 are to be stored in the working memory 16 or the storage memory 17 (S123).

Here, the number of sets of outgoing call history data and incoming call history data automatically transferred from the mobile phone 2 is assumed to be 20, for example. Furthermore, the number of sets of outgoing call history data and incoming call history data that can be stored in the working memory 16 is assumed to be five, for example. That is, the number of sets of outgoing call history data and incoming call history data that can be stored in the working memory 16 is smaller than the number of sets of outgoing call history data and incoming call history data automatically transferred from the mobile phone 2.

In this case, for example, the control unit 12 discards the outgoing call history data having an old outgoing call date/time among the outgoing call history data automatically transferred from the mobile phone 2, and then controls such that five sets of outgoing call history data having new outgoing call date/time out of the 20 sets of outgoing call history data automatically transferred from the mobile phone 2 will be stored in the working memory 16 with higher priority, as mobile-side outgoing call history data. In addition, the control unit 12 discards the incoming call history data having the old incoming call date/time among the incoming call history data, and controls such that five sets of incoming call history data having new incoming call date/time out of 20 sets of incoming call history data automatically transferred from the mobile phone 2 will be stored in the working memory 16 with higher priority, as mobile-side incoming call history data.

Immediately after the outgoing call history data is automatically transferred from the mobile phone 2, the control unit 12 retains the outgoing call history data illustrated at (a) in FIG. 17 as the outgoing call history data of the working memory 16. When the user performs an operation to display the outgoing call history data in this state, the control unit 12 controls to display the display screen illustrated at (b) in FIG. 19 on the display unit 15. Immediately after the incoming call history data is automatically transferred from the mobile phone 2, the control unit 12 retains the incoming call history data illustrated at (a) in FIG. 18 as the incoming call history data of the working memory 16. When the user performs an operation of displaying the incoming call history data in this state, the control unit 12 controls to display the display screen illustrated at (b) in FIG. 20 on the display unit 15.

When the mobile phone 2 and the hands-free device 1 establish a Bluetooth communication channel in this manner, the outgoing call history data and the incoming call history data stored before the mobile phone 2 establishes the Bluetooth communication channel will be automatically transferred to the working memory 16 of the hands-free device 1. This leads to formation of one phone system by the mobile phone 2 and the hands-free device 1, and this phone system enables implementation of hands-free calling. After the mobile phone 2 and the hands-free device 1 has formed one phone system in this manner, the user can select one of outgoing call operation using dialing key input, an outgoing call operation using the outgoing call history, or an outgoing call operation using the incoming call history, and an outgoing call operation using a phonebook so as to achieve an outgoing call operation, as well as being able to wait for an incoming call from the mobile phone network.

Here, the present embodiment uses a Bluetooth communication procedure including serial profile switching, such that a connection in a PBAP-based wireless communication is established in S5 illustrated in the flowchart of FIG. 6, thereafter the PBAP-based wireless communication is disconnected in S8, and HFP-based wireless communication is performed in S10. Therefore, in a case where there is a new incoming call to the mobile phone 2 or new outgoing call processing is performed by the operation unit 14 after establishing the connection using the HFP-based wireless communication in S10, the incoming call history data and outgoing call history data including the incoming call and outgoing call will be their own history data for the mobile phone 2, and thus, will be retained in their own memory. Accordingly, the control unit 12 of the hands-free device 1 can re-establish a connection in PBAP-based wireless communication during HFP-based wireless communication (simultaneous connection) in order to newly acquire the most recent incoming/outgoing call history data from the mobile phone 2.

However, disconnecting the HFP-based wireless communication and establishing a connection in the PBAP-based wireless communication in the serial connection in order to avoid simultaneous connections as much as possible might cause an occurrence of a state in which the mobile phone 2 and the hands-free device 1 forming one phone system to implement hands-free calling are substantially separated from each other for that duration, leading to a state of disabling hands-free calling. Therefore, in the present embodiment, once a connection in the HFP-based wireless communication is established in S10, the connection by the HFP-based wireless communication alone will be continued thereafter, in which the most recent incoming/outgoing call history data will be individually acquired and individually managed by the hands-free device 1. Hereinafter, details of this will be described.

Returning to the flowchart of FIG. 15, the control unit 12 determines whether the user has performed an outgoing call operation by dialing key input (S124), and determines whether the user has performed an outgoing call operation based on the outgoing call history (S125). Here, the process proceeds to the flowchart of FIG. 16. The control unit 12 determines whether the user has performed an outgoing call operation based on the incoming call history (S126), determines whether the user has performed an outgoing call operation using a phonebook (S127), and determines whether the call is an incoming call from the mobile phone network (S128).

Here, when the control unit 12 determines that the user has performed an outgoing call operation by dialing key input (S124 "YES"), the control unit 12 performs outgoing call processing of making a call using the phone number input by the user with dialing keys, as the outgoing phone number (S129). After finishing the outgoing call processing with the dialing key input, the control unit 12 erases the outgoing call history data having the oldest outgoing call date/time among the outgoing call history data stored in the working memory 16 at that point, as illustrated at (b) in FIG. 17 (S130). Subsequently, the control unit 12 controls to additionally store, in the working memory 16, the most recent outgoing call history data of the own device representing the calling by the dialing key input, as individual outgoing call history data (S131).

That is, when the user operates the dialing keys to input the phone number "09000000100" for example, and operates to make a call using the phone number "09000000100" as the outgoing phone number, the control unit 12 will additionally store the outgoing call history data representing the phone number "09000000100" in the working memory 16 as individual outgoing call history data, illustrated at (b) in FIG. 17. In this case, the control unit 12 controls to store, as a time stamp, the date/time acquired by the GPS device of the hands-free device 1 as the outgoing call date/time corresponding to the phone number "09000000100". That is, at (b) in FIG. 17, the outgoing call date/time of the most recent phone number "09000000100" is the date/time acquired by the GPS device of the hands-free device 1, while the outgoing dates/times of the remaining four phone numbers are dates/times acquired by the clock unit of the mobile phone 2. When the user performs an operation to display the outgoing call history data in this state, the control unit 12 controls to display the display screen illustrated at (c) in FIG. 19, on the display unit 15.

Furthermore, after determining that the user has performed the outgoing call operation based on the outgoing call history by pressing a "history button" 4a and then the "Outgoing call history button" 4b (S125 "YES"), the control unit 12 refers to the outgoing call history data stored in the working memory 16 (S132) and refers to the phonebook data stored in the working memory 16 (S133). Subsequently, as illustrated at (a) and (c) in FIG. 19, the control unit 12 controls to display the outgoing call operation screen based on the outgoing call history, on the display unit 15 (S134). In this case, in a case where the outgoing phone number of the outgoing call history data is registered in the phonebook data, the control unit 12 controls to display the registered name corresponding to the phone number on the display unit 15. In a case where the outgoing phone number of the outgoing call history data is not registered in the phonebook data, the control unit 12 controls to display the phone number on the display unit 15.

Next, the control unit 12 performs outgoing call processing of making an outgoing call using the phone number selected by the user as the outgoing phone number (S135). After finishing the outgoing call processing based on the outgoing call history, the control unit 12 erases the outgoing call history data having the oldest outgoing call date/time among the outgoing call history data stored in the working memory 16 at that point in a similar manner (S130). Subsequently, the control unit 12 controls to additionally store, in the working memory 16, the most recent outgoing call history data of the own device representing the calling based on the outgoing call history, as individual outgoing call history data (S131). In this case, the control unit 12 controls to store, as a time stamp, the date/time acquired by the GPS device of the hands-free device 1 as the outgoing call date/time corresponding to the outgoing phone number.

Furthermore, after determining that the user has performed the outgoing call operation based on the incoming call history by pressing the "history button" 4a and then pressing an "incoming call history button" 4c (S126 "YES"), the control unit 12 refers to the incoming call history data stored in the working memory 16 (S136) and refers to the phonebook data stored in the working memory 16 (S137). Subsequently, as illustrated at (b) and (c) in FIG. 20, the control unit 12 controls to display the outgoing call operation screen based on the incoming call history, on the display unit 15 (S138). In this case, in a case where the outgoing phone number of the incoming call history data is registered in the phonebook data, the control unit 12 controls to display the registered name corresponding to the phone number on the display unit 15. In a case where the outgoing phone number of the incoming call history data is not registered in the phonebook data, the control unit 12 controls to display the phone number on the display unit 15.

Next, the control unit 12 performs outgoing call processing of making an outgoing call using the phone number selected by the user as the outgoing phone number (S139). After finishing the outgoing call processing based on the incoming call history, the control unit 12 erases the outgoing call history data having the oldest outgoing call date/time among the outgoing call history data stored in the working memory 16 at that point in a similar manner (S130). Subsequently, the control unit 12 controls to additionally store, in the working memory 16, the most recent outgoing call history data of the own device representing the calling based on the incoming call history, as individual outgoing call history data (S131). In this case, the control unit 12 controls to store, as a time stamp, the date/time acquired by the GPS device of the hands-free device 1 as the outgoing call date/time corresponding to the outgoing phone number.

Furthermore, when the control unit 12 determines that the user has performed an outgoing call operation using the phonebook by pressing the "phonebook button" 4d (S127 "YES"), the control unit 12 refers to the phonebook data stored in the working memory 16 (S140), and controls to display the outgoing call operation screen based on the phonebook on the display unit 15 (S141) as illustrated at (b) in FIG. 21. Next, the control unit 12 performs outgoing call processing of making an outgoing call using the phone number selected by the user from among the numbers on the screen, as the outgoing phone number (S142). After finishing the outgoing call processing based on the phonebook, the control unit 12 erases the outgoing call history data having the oldest outgoing call date/time among the outgoing call history data stored in the working memory 16 at that point in a similar manner (S130). Subsequently, the control unit 12 controls to additionally store, in the working memory 16, the most recent outgoing call history data of the own device representing the calling based on the phonebook, as individual outgoing call history data (S131). In this case, the control unit 12 controls to store, as a time stamp, the date/time acquired by the GPS device of the hands-free device 1 as the outgoing call date/time corresponding to the outgoing phone number.

Furthermore, after determining an announcement from the mobile phone 2 via the Bluetooth communication unit 13 that an incoming call has arrived from a mobile phone network (S128 "YES"), the control unit 12 performs incoming call processing such as notification to notify the incoming call (S143). When the incoming call processing is completed, the control unit 12 erases the incoming call history data with the oldest incoming call date/time among the incoming call history data stored in the working memory 16 at that point (S144), and then controls to additionally store the most recent incoming call history data of the own device representing the incoming call, in the working memory 16 as individual incoming call history data (S145).

That is, after receiving the phone number "09000000200" as the incoming phone number from the mobile phone network via the Bluetooth communication unit 13, the control unit 12 controls to additionally store the incoming call history data representing the phone number "09000000200" in the working memory 16 as the individual incoming call history data.

With these processes, even when no connection in PBAP-based wireless communication is established after establishment of the connection in the HFP-based wireless communication in S10, in a case where there is new incoming call processing or outgoing call processing in S1 or later, it is possible to add individual incoming/outgoing call history data and display the added data on the display unit 15. As a result, there is no need to perform simultaneous connections using the HPF-based and PBAP-based communications, and there is no need, after establishing the connection in the HFP-based wireless communication in S10, to disconnect the HFP-based wireless communication and switch to connecting using the PBAP-based wireless communication. Accordingly, it is possible to prevent the mobile phone 2 and the hands-free device 1 forming one phone system from being substantially separated from each other.

The following will describe the process of displaying the incoming/outgoing call history data received in PBAP-based wireless communication and the process of displaying the incoming/outgoing call history data generated in the outgoing call processing and incoming call processing of S10 or later.

In the HFP-based wireless connection state in S10, the mobile phone 2 transmits the incoming phone number to the hands-free device 1 when receiving an incoming call, but does not transmit the incoming call date/time information at this time. Therefore, the control unit 12 controls to store, as a time stamp, the date/time acquired by the GPS device of the hands-free device 1 as the incoming call date/time corresponding to the phone number "09000000200". That is, at (b) in FIG. 18, the incoming call date/time of the most recent phone number "09000000200" is the date/time acquired by the GPS device of the hands-free device 1, while the incoming dates/times of the remaining four phone numbers are dates/times acquired by the clock unit of the mobile phone 2. When the user performs an operation to display the incoming call history data in this state, the control unit 12 controls to display the display screen illustrated at (c) in FIG. 20, on the display unit 15.

The above is a case where the number of pieces of outgoing call history data and incoming call history data that can be stored in the working memory 16 is less than the number of outgoing call history data and incoming call history data automatically transferred from the mobile phone 2, in which the outgoing call history data and incoming call history data with the old outgoing call date/time and incoming call date/time are discarded out of the outgoing call history data and incoming call history data automatically transferred from the mobile phone 2, and instead, the outgoing call history data and the incoming call history data with a new outgoing call date/time and incoming call date/time will be stored in the working memory 16 with higher priority among the outgoing call history data and incoming call history data automatically transferred from the mobile phone 2. Alternatively, it is also possible to have a configuration in which the hands-free device 1 specifies toward the mobile phone 2 the number of cases to be automatically transferred (five cases in the present embodiment) in the connection using the PBAP-based wireless communication so as to store the outgoing call history data and the incoming call history data having a new outgoing call date/time and incoming call date/time in the working memory 16 with higher priority.

The above-described configuration is an exemplary case in which, when a new outgoing call processing or a new incoming call processing is performed in the hands-free device 1, the oldest outgoing call history data and incoming call history data, out of the outgoing call history data and incoming call history data stored in the working memory 16, will be erased. However, from the user's point of view, the control unit 12 may perform the following alternative processing because of the following requests from the user. This is a process required when the connection using the PBAP-based wireless communication is not performed in S10 or subsequent steps, as in the present example.

That is, when comparing the date/time measured by the clock unit of the mobile phone 2 with the date/time acquired by the GPS device of the hands-free device 1, the date/time measured by the clock unit of the mobile phone 2 has more error and is less accurate compared to the date/time acquired by the GPS device. Moreover, the date/time can be set by the user arbitrarily, and thus, there might be a case where the user intentionally advances or delays the setting by a predetermined time (for example, ten minutes).

Here is an exemplary case where the user sets the date/time of the mobile phone 2 advanced by a predetermined time and where the hands-free device 1 stores the advanced set date/time in the working memory 16. In this case, rearranging outgoing call history data and incoming call history data automatically transferred from the mobile phone 2 and the outgoing call history data and incoming call history data individually stored in the hands-free device 1 as the own device sequentially in order of date/time will lead to the following result. That is, the outgoing call history data and incoming call history data resulting from new outgoing call processing and new incoming call processing performed on the hands-free device 1 would not be displayed on the top-level field but displayed on other fields (for example, in second or third-level field) on the list of the display screen even though the data sets are most recent data in the time axis. This causes discrepancy between the time axis stored by the user and the time axis displayed by the display unit 15, leading to the sense of incompatibility felt by the user.

In order to deal with such a problem, the control unit 12 arranges the outgoing call history data and the incoming call history data automatically transferred from the mobile phone 2 to be displayed in the fields other than the top-level field in order of date/time within a closed range, while arranging new outgoing call history data and new incoming call history data generated in the own device to be displayed in the top-level field. With this configuration, the data can be displayed in harmony with the time axis sensed by the user, making it possible to suppress occurrence of the sense of incompatibility felt by the user.

There is a note regarding the case where the control unit 12 arranges the outgoing call history data and the incoming call history data automatically transferred from the mobile phone 2 to be sequentially displayed in order of the date/time. That is, in a case where the outgoing call history data or incoming call history data includes outgoing call order data indicating the outgoing call order or incoming call order data indicating the incoming call order, respectively, the control unit 12 would not have to rearrange the data using date/time data contained in the outgoing call history data and the incoming call history data. Instead, the control unit 12 may rearrange and display the outgoing call history data and incoming call history data based on the outgoing call order data and incoming call order data.

In addition, even in a case where the outgoing call order data and the incoming call order data are not explicitly contained, it is allowable to display the data based on the rule that the higher the data is listed, the more recent the data is in a case where the data has been transmitted from the mobile phone 2 in the form of the list format as illustrated in FIGS. 11A, 12A, and 13A, and then received by the hands-free device 1. That is, the mobile phone 2 transmits data in the format from which the hands-free device 1 can identify the actual outgoing order and incoming order.

In this case, for example, in some of the mobile phones 2, in a case where there is an incoming call from Person A at 12:00:00 and an incoming call from Person B at 12:00:30, the time would be classified as the exactly the same 12:00 when the unit of time stamp is minutes instead of seconds, and thus, this record is stored as the incoming call history data of the mobile phone 2. In a case where this data is received by the hands-free device 1 and rearranged in chronological order, it would be difficult to perform rearrangement in the proper order. Therefore, performing, on the mobile phone 2, attachment of outgoing call order data and incoming call order data, or data transmission in the form of the above list, would be more convenient. With this configuration, the data can be displayed in harmony with the time axis sensed by the user, making it possible to suppress occurrence of the sense of incompatibility felt by the user.

In these cases, the date/time data included in the outgoing call history data or the incoming call history data is treated as auxiliary data, and the above-described outgoing call order data and incoming call order data will be the actual incoming call order and outgoing call order regarding the user. While repeating incoming call processing and outgoing call processing in independent operation, the mobile phone 2 can grasp the orders of incoming/outgoing calls since they occurred as independent operations, making it possible to manage the incoming/outgoing call history in that order. Therefore, regardless of the outgoing call date/time and the incoming call date/time by the own clock unit, the outgoing call order data and the incoming call order data are added to every outgoing call and incoming call and transmitted to the hands-free device 1, and then the hands-free device 1 performs processing to arrange incoming/outgoing call history data based on the incoming call order data and the outgoing call order data. Alternatively, it is also possible to transmit, to the hands-free device 1, the above list created on the mobile phone 2 based on the determination of the actual outgoing order and incoming order without attaching the outgoing call order data or the incoming call order data, allowing the hands-free device 1 to perform processing of arranging the data in the order of actual outgoing and incoming calls.

In a case where the clock of the mobile phone 2 is set to advance or be delayed at a certain timing and where an outgoing call or an incoming call occurs immediately after this setting, the outgoing call history display and the incoming call history display on the mobile phone 2 will be displayed in the actual order, although the outgoing call date/time and incoming call date/time to be added to individual data would be different from this display order. Accordingly, rearranging such incoming/outgoing call history data on the hands-free device 1 based on the outgoing call date/time and the incoming call date/time would lead to the display of data performed in an order different from the actual order. In view of this, the method of utilizing outgoing call order data, incoming call order data, or list format method can be considered to be convenient to achieve arrangement in the actual order of the outgoing/incoming calls.

As a result, the control unit 12 can display the data on the display unit 15 in the order of the actual outgoing calls and the incoming calls recorded on the mobile phone 2. After performing such data processing, the hands-free device 1 can perform outgoing call processing using its own dialing key input, outgoing call processing using an outgoing call history, outgoing call processing using an incoming call history, and outgoing call processing using phonebook data as described above. In this case, the outgoing call history data of which outgoing call order data is the oldest or considered to be the oldest will be erased, among the outgoing call history data stored in the working memory 16 at that point, and the most recent outgoing call history data of the own device representing the outgoing call using the outgoing call history will be additionally stored in the working memory 16 as individual outgoing call history data. Meanwhile, in a case where new incoming call processing occurs, the control unit 12 erases the incoming call history data whose incoming call order data among the incoming call history data stored in the working memory 16 at that point is the oldest or the incoming call history data considered to be the oldest, and controls the most recent incoming call history data of the own device representing the incoming call based on the incoming call history to be additionally stored in the working memory 16 as the individual incoming call history data.

In the case of such outgoing call processing and incoming call processing, the control unit 12 stores the date/time acquired by the GPS device of the hands-free device 1, as a time stamp, as the outgoing call date/time corresponding to the outgoing phone number and the incoming call date/time corresponding to the incoming phone number. In this manner, the data can be displayed in harmony with the time axis sensed by the user, making it possible to suppress occurrence of the sense of incompatibility felt by the user.

Further, when the control unit 12 receives an entire history data display request of collectively displaying the outgoing call history data and the incoming call history data, the control unit 12 is required to perform a predetermined sort process as compared with the case where the outgoing call history data alone or the incoming call history data alone is to be displayed. That is, as described above, there are exemplary cases where the incoming call history data and the outgoing call history data are transmitted from the mobile phone 2 on the actual time axis so as to indicate the newest-first chronological order including the outgoing call order data and the incoming call order data, or where the data are transmitted in the above list format without including the order data. In these cases, as described above, when the hands-free device 1 displays the outgoing or incoming call history data in the order of notification not based on the outgoing call date/time and the incoming call date/time contained in the received data, the display would be the data displayed in the order of display on the mobile phone 2, in the case of displaying the outgoing call history alone or incoming call history alone.

Here, when displaying the entire history data, the hands-free device 1 can grasp the most recent data of the outgoing call history data and the most recent data of the incoming call history data. However, it is difficult, in practice, to specify which is the most recent out of the two pieces of the most recent data. Therefore, in the present example, when displaying the entire history data, the control unit 12 compares the outgoing call date/time contained in the outgoing call history data and the incoming call date/time contained in the incoming call history data, and then displays the one having the most recent date/time, as the most recent data.

For example, in a case where there are five pieces of incoming call history data and five pieces of outgoing call history data, the control unit 12 sorts these ten pieces in order of date/time and displays them in this sorted order. With this process, it is possible, in most cases, to display the outgoing call history data and the incoming call history data in order that is substantially based on the actual time axis of the user. However, there is an exemplary case where the time stamp function on mobile phone 2 operates in units of "minute". In this case, with an occurrence of an incoming call from Person A at 12:00:00 and an occurrence of outgoing call to Person B at 12:00:30, the outgoing call date/time and the incoming call date/time can be treated as the same as 12:00. In this case, the control unit 12 performs a predetermined rearrangement process such as displaying the outgoing call as the most recent compared with the incoming call, or vice versa.

Furthermore, when the newest-first chronological order of three pieces of incoming call history data (A to C) received in the PBAP-based wireless communication can be grasped as described above, and the newest-first chronological order of pieces of outgoing call history data (D to F) received by PBAP can be grasped, the control unit 12 compares the dates/times of the outgoing call history data and the incoming call history data and performs the rearrangement process as follows.

First, the control unit 12 compares the dates/times of A and D, sets the newer one as the first (for example, A), then compares B and D, and sets the newer one as the second (for example, B). Next, the control unit 12 compares C and D, and sets the newer one is the third (for example, D), then compares the dates/times of C and E, and sets the newer one as the fourth (for example, C). Next, the control unit 12 sets E as the fifth, and sets F as the sixth, since it is known that E is newer than F among the remaining. When the compared dates/times are the same, the control unit 12 performs rearrangement such that the outgoing calls are prioritized over the incoming calls, or vice versa, as a predetermined rearrangement rule.

In addition, in the case of transferring phonebook data on the mobile phone 2, it is necessary to convert the data format of the phonebook data to the "vCard" data format defined in the Bluetooth communication standard before transfer. In addition, the frequency of data update in the phonebook data is generally low, compared with the cases of the outgoing call history data and the incoming call history data. Based on these, the control unit 12 may first receive the outgoing call history data and the incoming call history data from the mobile phone 2 via the Bluetooth communication unit 13, and may thereafter receive the phonebook data from the mobile phone 2 via the Bluetooth communication unit 13. Alternatively, the control unit 12 may receive the outgoing call history data and the incoming call history data from the mobile phone 2 via the Bluetooth communication unit 13, and may thereafter receive the phonebook data from the mobile phone 2 via the Bluetooth communication unit 13 only in a case where the user performs a predetermined operation on the operation unit 14.

Furthermore, whether to perform phonebook data transfer either by user's operation or automatic transfer can be set by the user by selecting manual transfer or automatic transfer in the hands-free device 1, and the transfer process may be performed in accordance with this setting. It is also possible to transfer the phonebook data alone by performing a manual transfer operation by the user after establishing an HFP-based wireless connection in a state where the automatic transfer is set to "No transfer". Note that this manual transfer operation will disconnect the HFP-based wireless communication and the connection will be switched to the PBAP-based wireless communication connection. After completion of the data transfer, connection in the HFP-based wireless communication is established again with the mobile phone 2, enabling hands-free calling.

With this setting of "No transfer", outgoing call history data and incoming call history data with high data update frequency can be received with higher priority over phonebook data with low data update frequency. Moreover, in view of the circumstance that the transfer of the phonebook data needs data conversion although the transfer of the outgoing call history data and incoming call history data do not need data conversion, outgoing call history data and incoming call history data that needs shorter transfer time can be received with higher priority over the phonebook data that needs longer transfer time. In addition, by transferring outgoing call history data and the incoming call history data alone, the amount of data to be transferred can be reduced. As a result, communication using the transfer protocol can be performed at an early stage, and subsequent communication using the hands-free protocol can be performed at an early stage. Accordingly, the time required to make a hands-free call can be shortened in a case where a mobile phone is brought into a vehicle. Furthermore, it is possible to select, as needed, whether to receive the phonebook data having a low data update frequency and a long transfer time, leading to higher convenience.

When the phonebook data has been transferred as needed by the user's manual transfer operation, communication using the hands-free protocol is automatically executed at completion of the transfer. This makes it possible to perform hands-free calling when making a call using the phonebook data, leading to improvement of convenience. Furthermore, when the phonebook data has been transferred by the manual transfer operation, it is preferable to store the phonebook data alone in the non-volatile storage memory 17 and retrieve the stored data from the storage memory 17 so as to be used as a phonebook data at the time of next startup of the hands-free device 1.

Furthermore, the control unit 12 may classify the outgoing call history data, the incoming call history data, the phonebook data, and other data received from the mobile phone 2 separately for each of the mobile phones 2 to be stored in the working memory 16. In this case, the control unit 12 associates the mobile phone 2 with the data stored in the working memory 16 as follows, for example. That is, when the outgoing call history data, the incoming call history data, the phonebook data, and other data received from the mobile phone 2 are stored in the working memory 16, the control unit 12 generates a link key based on a mobile phone ID received from the mobile phone 2 and individually assigned to the mobile phone 2 and based on a device ID individually assigned to the hands-free device 1, and then, stores the generated link key in the working memory 16 in association with various types of data. When the control unit 12 receives the mobile phone ID from the mobile phone 2 thereafter, the control unit 12 re-generates the link key based on the received mobile phone ID and the device ID, and updates the various types of data stored in the working memory 16 in association with the generated link key.

Figure 23:
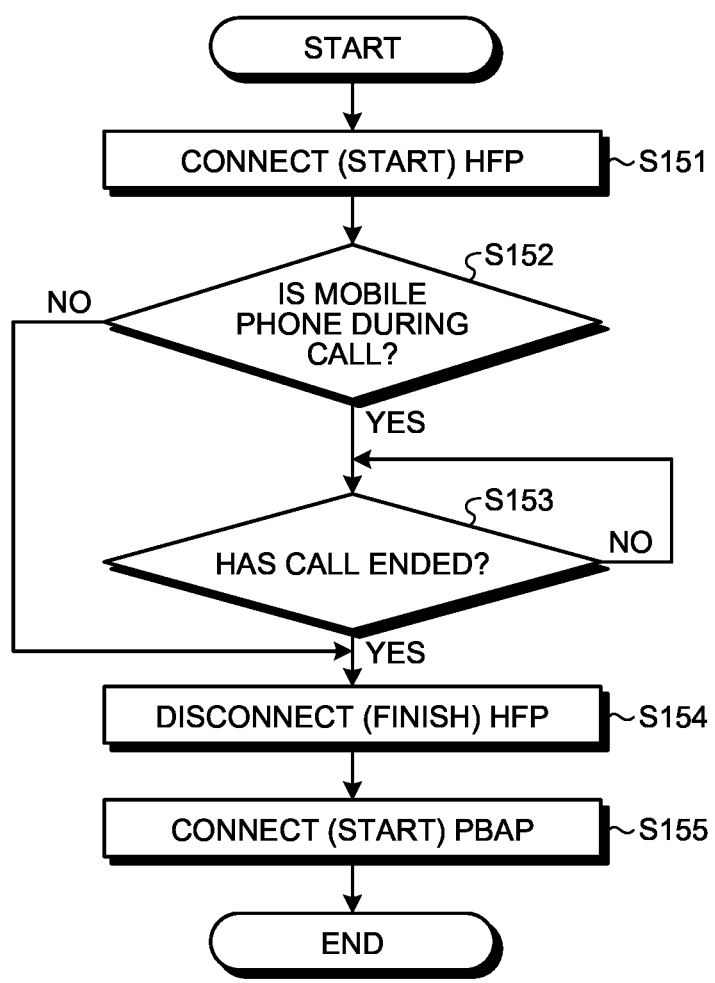
FIG. 23 is a flowchart illustrating details of a HFP process flow according to an embodiment.

Next, an HFP process in S2 of the flowchart in FIG. 6 described above will be described in detail. FIG. 23 is a flowchart illustrating details of the flow of the HFP process according to the present embodiment.

The hands-free call connection unit 102 determines that a communication channel has been established with the mobile phone 2 existing in the Bluetooth communication range, and thereafter establishes (starts) a connection in HFP-based communication (S151), and then, determines whether the mobile phone 2 is during a call (S152). Whether the mobile phone 2 is during a call or in standby is notified by HFP-based wireless communication. The notification is received by the hands-free device 1, and is determined based on the received communication state. In addition, S151 corresponds to the process of S2.

Here, having determined that the mobile phone 2 is not during a call, that is, has gone into the standby state of waiting for an incoming call (S152 "No"), the hands-free call connection unit 102 disconnects (finishes) the wireless communication in the connected HFP (S154), and then, the first data transfer control unit 103 establishes a connection in the PBAP-based wireless communication (S155). That is, in a case where the mobile phone 2 is not during a call, the hands-free call connection unit 102 promptly and automatically disconnects the HFP-based wireless communication in connection, and performs automatic connection using the PBAP-based wireless communication, thereby receiving the outgoing call history data, the incoming call history data, and the phonebook data transmitted from the mobile phone 2 via the Bluetooth communication unit 13.

Furthermore, having determined that the mobile phone 2 is during a call (S152 "YES"), the hands-free call connection unit 102 determines that the call can be executed as the hands-free call using the hands-free device 1, and maintains the HFP-based wireless communication. Whether to execute this call basically depends on the mobile phone 2. That is, when the mobile phone 2 makes a connection using the HFP-based wireless communication during the call, the received voice might be automatically transmitted to the Bluetooth communication unit 13, or there is a case where the received voice is transmitted to the Bluetooth communication unit 13 by the operation on the mobile phone 2.

Subsequently, the hands-free call connection unit 102 determines whether the mobile phone 2 has finished the call (S153). After determining that the mobile phone 2 has finished the call (S153 "Yes"), the hands-free call connection unit 102 disconnects (finishes) the wireless communication on the existing HFP (S154 "No"), and then, the first data transfer control unit 103 establishes a connection in the PBAP-based wireless communication (S155). That is, in a case where the mobile phone 2 is during a call, the hands-free call connection unit 102 disconnects the wireless communication on the connected HFP after completion of the call and establishes a connection in the PBAP-based wireless communication, thereby receiving the outgoing call history data, the incoming call history data, and the phonebook data transmitted from the mobile phone 2 after completion of the hands-free call by the user, via the Bluetooth communication unit 13. In addition, S152 and S153 correspond to the process between S3 and S4.

When the mobile phone 2 is connected to the hands-free device 1 in this manner, the hands-free device 1 determines whether the mobile phone 2 is during a call. In a case of during the call, the hands-free device 1 will maintain the HFP-based wireless communication and will not make a connection using a PBAP-based wireless communication, since switching to the connection using the PBAP-based wireless communication disables the shift to hands-free calling. When it is determined that the call has ended, the HFP-based wireless communication is disconnected and the connection using a PBAP-based wireless communication will be performed. As a result, in a case where the mobile phone 2 is during an independent call, it is possible to smoothly switch to the hands-free call.

Furthermore, the control unit 12 may receive and store the history of the incoming call from the mobile phone 2 answered as incoming call history data, and the history of an unanswered incoming call (missed call), separately from each other. FIG. 24 is a diagram illustrating another example of a transition of a display screen when a user performs an outgoing call operation using an incoming call history according to the present embodiment. After determining that the user has pressed the "history button" 4*a* and then the "incoming call history button" 4*c* to perform the outgoing call operation based on the incoming call history, the control unit 12 refers to the incoming call history data stored in the working memory 16, refers to the phonebook data stored in the working memory 16, and controls such that the outgoing call operation screen based on the incoming call history is to be displayed on the display unit 15 as illustrated at (b) and (c) in FIG. 24. On this screen, either an icon figure (combination of a handset and an arrow) indicating that the incoming call was answered or an icon figure (combination of a handset and a cross (x) mark) indicating that the incoming call was not answered (missed call), for each of pieces of data.

In this manner, according to the hands-free device 1 of the present embodiment, the data transferred from the mobile phone 2 is deleted when predetermined conditions are satisfied, whereby the data transferred to the hands-free device 1 can be deleted at an appropriate timing.

For example, in recent years, the use of car sharing has become widespread. When the hands-free device 1 is mounted on the shared car, another user will use the hands-free device 1 after the user finishes using the share car, in some cases. In such a case, by deleting, on the hands-free device 1, the history data and the phonebook data transferred from the user's mobile phone 2, it is possible to suppress the disclosure of the data to other users. The similar is possible for rental cars or the like.

Furthermore, in the present embodiment, one of the predetermined conditions is that after the communication connection with the mobile phone 2 is canceled, another mobile phone 2 different from the mobile phone is connected. Therefore, according to the hands-free device 1 of the present embodiment, for example, when a plurality of users is in the vehicle 3, and the user who drives the vehicle 3 changes, it is possible to suppress the disclosure of data transferred from the mobile phone 2 of the previous user, to the other users.

Furthermore, in the present embodiment, one of the predetermined conditions is that the communication connection with the mobile phone 2 is re-established after the communication connection with the mobile phone 2 has been canceled. Therefore, according to the hands-free device 1 of the present embodiment, even in a case where the mobile phone 2 is the same, it is possible to suppress the possibility of data disclosure by deleting the previously transferred data depending on the setting of the hands-free device 1.

Furthermore, in the present embodiment, one of the predetermined conditions is that the communication connection with the mobile phone 2 is re-established after a predetermined time has elapsed since the communication connection with the mobile phone 2 has been canceled. Therefore, according to the hands-free device 1 of the present embodiment, it is possible to provide a time allowance until data deletion.

Furthermore, in the present embodiment, one of the predetermined conditions is that the ignition power is turned on after the ignition power of the vehicle 3 is turned off. Therefore, according to the hands-free device 1 of the present embodiment, by deleting the data transferred at the previous use of the vehicle 3 when the engine of the vehicle 3 is turned off and then the engine of the vehicle 3 is turned on again, it is possible to suppress the disclosure of past data to new a user when the user of the vehicle 3 changes while the engine is off.

Furthermore, in the present embodiment, one of the predetermined conditions is that the ignition power is turned on after a predetermined time has elapsed since the ignition power of the vehicle 3 is turned off. Therefore, according to the hands-free device 1 of the present embodiment, it is possible to provide a time allowance until data deletion.

Furthermore, in the present embodiment, one of the predetermined conditions is that a user's operation of manually deleting the data has been received. Therefore, according to the hands-free device 1 of the present embodiment, the user can delete the data transferred from the mobile phone 2 at a desired timing.

In the present embodiment, the hands-free device 1 is connected to the mobile phone 2 using HFP-based and PBAP-based connections. However, communication protocols other than these may be adopted. Furthermore, the hands-free device 1 and the mobile phone 2 may be connected by a wireless communication standard other than Bluetooth.

Although the present embodiment has described that the hands-free call connection unit 102 and the hands-free call execution unit 106 are mutually different functional units, the hands-free call connection unit 102 may include the functions of the hands-free call execution unit 106.

Programs executed by the hands-free device 1 of each of the above-described embodiments are provided by being incorporated in ROM or the like in advance. The programs executed by the hands-free device 1 of each of the above-described embodiments may be provided as a file in an installable format or an executable format, recorded in a computer readable recording medium such as CD-ROM, a flexible disk (FD), a CD-R, or a Digital Versatile Disk (DVD).

Furthermore, the programs executed by the hands-free device 1 of each of the above-described embodiments may be stored on a computer connected to a network such as the Internet and be provided by downloading via the network. Furthermore, the programs executed by the hands-free device 1 of each of the above-described embodiments may be provided or distributed via a network such as the Internet.

First Modification

The hands-free device 1 may notify the user of confirmation of whether to delete the data. For example, the display control unit 105 of the hands-free device 1 of the present modification displays a confirmation screen on the display unit 15 for confirming to the user whether to delete the data.

Figure 25:
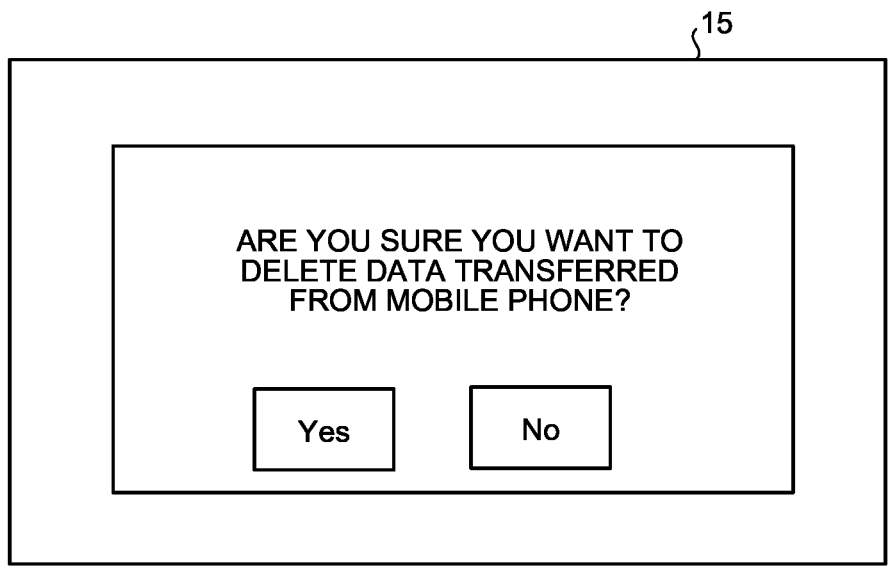
FIG. 25 is a view illustrating an example of a confirmation screen according to a first modification.

FIG. 25 is a view illustrating an example of a confirmation screen according to the present modification. When the engine of the vehicle 3 is turned off, that is, when the ignition power is turned off in a case where the automatic deletion setting is "off", for example, the display control unit 105 displays on the display unit 15 a confirmation screen that confirms to the user whether to delete the data. The display timing of the confirmation screen is not limited to this.

The confirmation screen may be, for example, a pop-up screen superimposed on the standby screen, or may be displayed on the entire screen of the display unit 15. As illustrated in FIG. 25, the confirmation screen includes a message confirming to the user whether to delete the data, such as "Are you sure you want to delete the data transferred from the mobile phone?".

When the user presses the "Yes" button on the confirmation screen, the operation of deleting data is received by the reception unit 101. This is an example of manual deletion by the user. Also, when the user presses the "No" button, the manual deletion will not be executed.

Furthermore, in the present modification, the deletion conditions include "receiving the operation of deleting data by the user on the confirmation screen".

With this configuration, according to the hands-free device 1 of the present modification, it is possible to reduce the possibility of user's failure to delete the data even though the user desires to delete the data.

Second Modification

The above-described embodiment has described the timing of data deletion in a case where the ignition power is turned off due to the turn-off of the engine of the vehicle 3. However, it is allowable to employ a configuration capable of turn off the device power of the hands-free device 1 even when the ignition power is on.

For example, when the device power of the hands-free device 1 is turned off, the hands-free device 1 shifts to a sleep mode. In the present modification, when the automatic deletion setting is "on" and the deletion timer setting is "on", a condition that "a predetermined time has elapsed after the hands-free device 1 has shifted to a sleep mode" is one of the predetermined conditions.

In the present modification, when the automatic deletion setting is "on" and the deletion timer setting is "off", a condition that "the hands-free device 1 has shifted to a sleep mode" is one of the predetermined conditions.

According to the hands-free device 1 of the present modification, data can be deleted at an appropriate timing even when the hands-free device 1 has shifted to a sleep mode.

Third Modification

Furthermore, in the above-described embodiment, the data transferred from the mobile phone 2 is stored in the working memory 16 or the storage memory 17 by the hands-free device 1. However, the data storage destination may be selectable by the user.

For example, the display control unit 105 may display, on the display unit 15, a selection screen that allows the user to select whether to store the data transferred from the mobile phone 2 in the non-volatile storage memory 17. In a case where the user selects not to store the data transferred from the mobile phone 2 in the non-volatile storage memory 17, the data transferred from the mobile phone 2 will be stored in the volatile working memory 16 alone. In this case, even in a case where the automatic deletion setting is "off", the data transferred from the mobile phone 2 will be deleted when the power of the hands-free device 1 is turned off. When the automatic deletion setting is "on", it is also possible to be configured to automatically delete both the data stored in the working memory 16 and the data stored in the storage memory 17, rather than automatically deleting data stored in the storage memory 17 alone. There is no limitation to the configuration in this respect.

Fourth Modification

Although the hands-free device 1 is mounted on the vehicle 3 in each of the above-described embodiments, the hands-free device 1 is not limited to an in-vehicle device.

For example, the hands-free device 1 may be a device usable outside the vehicle 3 when the user makes a hands-free call.

Fifth Modification

Furthermore, although the hands-free device 1 in each of the above-described embodiments is implemented as one function of the in-vehicle navigator mounted on the vehicle 3, the implementation is not limited to this configuration. The hands-free device 1 may be a hands-free dedicated device that mainly includes a hands-free function, or may be a device having a hands-free function mounted on a vehicle audio device that reproduces a CD or a radio. Furthermore, the hands-free device 1 may have a portable (mobile) configuration.

Sixth Modification

Furthermore, in the above-described embodiment, the reception unit 101, the hands-free call connection unit 102, the first data transfer control unit 103, the second data transfer control unit 104, the display control unit 105, the hands-free call execution unit 106, and the deletion unit 107 are actualized by reading and executing programs by the control unit 12 from the storage memory 17. Alternatively, however, these functions may be actualized by a hardware circuit.

Furthermore, the above-described embodiment is an exemplary case where one processor is used to actualize the reception unit 101, the hands-free call connection unit 102, the first data transfer control unit 103, the second data transfer control unit 104, the display control unit 105, the hands-free call execution unit 106, and the deletion unit 107. However, these functional units may be actualized by a plurality of processors.

For example, the function of the deletion unit 107 may be actualized by a hardware processor or the like different from the control unit 12.

Other Modifications

Furthermore, the hands-free device 1 may have a configuration in which the outgoing call history data, the incoming call history data, and the phonebook data received from the mobile phone 2 are stored in the storage memory 17, and the outgoing call history data, the incoming call history data, and the phonebook data received from the mobile phone 2 will be updated and stored every time the hands-free device 1 receives from the mobile phone 2 the outgoing call history data, the incoming call history data, and the phonebook data. Furthermore, the outgoing call history data, the incoming call history data, and the phonebook data received from the mobile phone 2 may be stored in both the working memory 16 and the storage memory 17, and the storage memory 17 may be used as backup memory.

The number of pieces of outgoing call history data and incoming call history data that can be stored in the working memory 16 may be one. In this case, when the hands-free device 1 performs outgoing call processing or incoming call processing, the outgoing call history data and incoming call history data received in the connection using the PBAP-based wireless communication will be erased every time.

Although the hands-free device 1 simultaneously displays a plurality of pieces of outgoing call history data and a plurality of incoming call histories, it is also allowable to display one by one. In this case, for example, it is also allowable to first display the most recent data and then may sequentially display the next recent data using the operation of the operation unit 14.

According to the hands-free device in the present disclosure, the data transferred to the hands-free device can be deleted at an appropriate timing.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A hands-free device, comprising:
a memory; and
a hardware processor coupled to the memory, the hardware processor being configured to:
connect to a mobile phone to enable a hands-free call;
receive at least one of outgoing call history data, incoming call history data, missed call history data, and phonebook data stored in the mobile phone; and
delete the data transferred from the mobile phone in a case where a predetermined condition is satisfied,
wherein the hands-free device is mounted on a vehicle, and the predetermined condition includes an ignition power of the vehicle being turned on after a predetermined time has elapsed since the ignition power of the vehicle is turned off.

2. The hands-free device according to claim 1, wherein the predetermined condition further includes, after a communication connection with the mobile phone is canceled, a further mobile phone different from the mobile phone being connected.

3. The hands-free device according to claim 1, wherein the predetermined condition further includes a communication connection with the mobile phone being re-established after a communication connection with the mobile phone is canceled.

4. The hands-free device according to claim 1, wherein the predetermined condition further includes a communication connection with the mobile phone being re-established after a predetermined time has elapsed since a communication connection with the mobile phone is canceled.

5. The hands-free device according to claim 1, wherein the predetermined condition further includes an ignition power of the vehicle being turned on after the ignition power of the vehicle is turned off.

6. The hands-free device according to claim 1, wherein the predetermined condition further includes a predetermined time having elapsed after the hands-free device has shifted to a sleep mode.

7. The hands-free device according to claim 1, wherein the hardware processor is further configured to receive, from a user, an operation of deleting the data transferred from the mobile phone, and
the predetermined condition further includes the operation of deleting the data performed by the user having been received.

8. The hands-free device according to claim 1, wherein the hardware processor is further configured to display, on a display, a confirmation screen for confirming to the user whether to delete the data, and
the predetermined condition further includes the operation of deleting the data performed by the user having been received on the confirmation screen.

9. The hands-free device according to claim 1, wherein the hardware processor is further configured to display, on a display, a setting screen on which a user can set the predetermined condition.

10. A data transfer method for a hands-free device, the data transfer method comprising:
    connecting, by the hands-free device, to a mobile phone to enable a hands-free call;
    receiving, by the hands-free device, at least one of outgoing call history data, incoming call history data, missed call history data, and phonebook data stored in the mobile phone; and
    deleting, by the hands-free device, the data transferred from the mobile phone in a case where a predetermined condition is satisfied,
    wherein the hands-free device is mounted on a vehicle, and
    the predetermined condition includes an ignition power of the vehicle being turned on after a predetermined time has elapsed since the ignition power of the vehicle is turned off.

11. A non-transitory computer readable medium on which an executable program is recorded, the program instructing a hands-free device to carry out:
    connecting, by the hands-free device, to a mobile phone to enable a hands-free call;
    receiving, by the hands-free device, at least one of outgoing call history data, incoming call history data, missed call history data, and phonebook data stored in the mobile phone; and
    deleting, by the hands-free device, the data transferred from the mobile phone in a case where a predetermined condition is satisfied, wherein
    the hands-free device is mounted on a vehicle, and
    the predetermined condition includes an ignition power of the vehicle being turned on after a predetermined time has elapsed since the ignition power of the vehicle is turned off.

\* \* \* \* \*